US009859533B2

(12) United States Patent
Oshiba et al.

(10) Patent No.: US 9,859,533 B2
(45) Date of Patent: Jan. 2, 2018

(54) ENERGY STORAGE APPARATUS

(71) Applicant: GS Yuasa International Ltd., Kyoto-shi (JP)

(72) Inventors: Masashi Oshiba, Kyoto (JP); Hiroyasu Koyama, Kyoto (JP); Yuta Mizukawa, Kyoto (JP); Kazuya Fujisawa, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 354 days.

(21) Appl. No.: 14/297,487

(22) Filed: Jun. 5, 2014

(65) Prior Publication Data
US 2014/0370363 A1 Dec. 18, 2014

(30) Foreign Application Priority Data

Jun. 14, 2013 (JP) .................................. 2013-125994

(51) Int. Cl.
*H01M 2/02* (2006.01)
*H01M 2/10* (2006.01)
*H01M 10/625* (2014.01)
*H01M 10/6563* (2014.01)
*H01M 10/613* (2014.01)

(52) U.S. Cl.
CPC ....... *H01M 2/0217* (2013.01); *H01M 2/1061* (2013.01); *H01M 2/1072* (2013.01); *H01M 2/1077* (2013.01); *H01M 10/613* (2015.04); *H01M 10/625* (2015.04); *H01M 10/6563* (2015.04)

(58) Field of Classification Search
CPC ............ H01M 10/613; H01M 10/625; H01M 10/6563; H01M 10/6555; H01M 2/1077; H01M 2/1061; H01M 2/1072; H01M 2/1085; H01M 2/1088; H01M 2/0217
See application file for complete search history.

(56) References Cited

U.S. PATENT DOCUMENTS

| 5,534,364 A | 7/1996 | Watanabe et al. |
| 2001/0031395 A1 * | 10/2001 | Fukuda ................. H01M 2/266 429/211 |
| 2006/0093899 A1 | 5/2006 | Jeon et al. |
| 2010/0196749 A1 | 8/2010 | Yoshida et al. |
| 2011/0281155 A1 * | 11/2011 | Ito ....................... H01M 2/0473 429/179 |

(Continued)

FOREIGN PATENT DOCUMENTS

| JP | S 48-064720 U | 11/1971 |
| JP | S 52-102429 U | 1/1976 |

(Continued)

OTHER PUBLICATIONS

Extended European Search Report dated Nov. 25, 2014.

*Primary Examiner* — Eugenia Wang
(74) *Attorney, Agent, or Firm* — McGinn IP Law Group, PLLC.

(57) ABSTRACT

An energy storage apparatus includes: one or more energy storage devices, each energy storage device having a side surface; and an outer housing that houses the one or more energy storage devices. The outer housing includes an attachment portion for attaching a partition plate adjacently to the side surface of the one or more energy storage devices.

19 Claims, 16 Drawing Sheets

(56) References Cited

U.S. PATENT DOCUMENTS

| | | | | |
|---|---|---|---|---|
| 2012/0263989 A1* | 10/2012 | Byun | ............... | H01M 2/1077 |
| | | | | 429/99 |
| 2012/0282516 A1* | 11/2012 | Kim | ............... | H01M 2/1077 |
| | | | | 429/159 |
| 2013/0252063 A1* | 9/2013 | Park | ............... | H01M 2/14 |
| | | | | 429/120 |
| 2013/0280565 A1* | 10/2013 | Lee | ............... | H01M 2/0207 |
| | | | | 429/71 |

FOREIGN PATENT DOCUMENTS

| | | | |
|---|---|---|---|
| JP | S 57-035218 U | 8/1980 | |
| JP | 2003-017876 A | 1/2003 | |
| JP | 2003-258462 A | 9/2003 | |
| JP | 2007-273149 A | 10/2007 | |
| JP | 2009-211835 A | 9/2009 | |
| JP | 2010-015954 A | 1/2010 | |
| JP | 2012-128983 A | 7/2012 | |
| JP | 2013-073914 A | 4/2013 | |
| JP | 2013-143260 A | 7/2013 | |
| JP | 2014-197516 A | 10/2014 | |
| KR | WO 2012064160 A2 * | 5/2012 | .......... H01M 2/0207 |

\* cited by examiner

FIG. 12
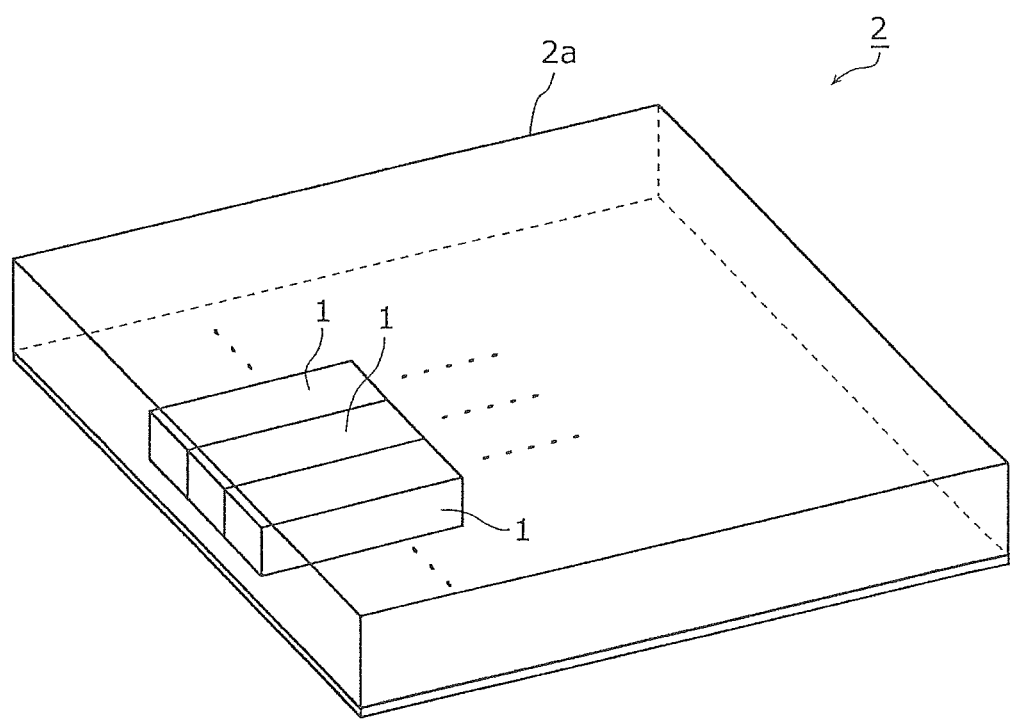
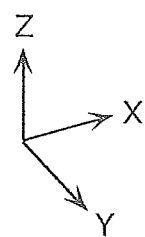

ENERGY STORAGE APPARATUS

CROSS REFERENCE TO RELATED APPLICATIONS

The present application is based on and claims priority of Japanese Patent Application No. 2013-125994 filed on Jun. 14, 2013. The entire disclosure of the above-identified application, including the specification, drawings, and claims is incorporated herein by reference in its entirety.

FIELD

The present invention relates to an energy storage apparatus including one or more energy storage devices housed in an outer housing.

BACKGROUND

Battery packs that include a plurality of energy storage apparatuses housed in a pack case are known. The plurality of energy storage apparatuses each include one or more energy storage devices (battery cells) housed in an outer housing (module case). Each energy storage apparatus included in the battery pack requires a configuration in which electrical insulation of the battery cells is maintained and heat from the battery cells is prevented from transferring to surrounding components. For example, in Japanese Unexamined Patent Application Publication No, 2012-128983, when a plurality of the battery cells are to be housed in the module case, the plurality of battery cells are arranged spaced apart from each other in order to maintain electrical and heat insulation.

Another energy storage apparatus is known that can further secure electrical and heat insulation when a plurality of battery cells are to be housed in a module case by using partition plates formed between the plurality of battery cells in the module case.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus including an outer housing having increased design flexibility and a configuration that is changeable according to different design requirements.

An energy storage apparatus according to one aspect of the present invention includes: one or more energy storage devices, each energy storage device having a side surface; and an outer housing that houses the one or more energy storage devices. The outer housing includes an attachment portion for attaching a partition plate adjacently to the side surface of the one or more energy storage devices.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 12 is a perspective view illustrating a configuration of a battery pack including the energy storage apparatus.

DESCRIPTION OF EMBODIMENT

Figure 1:
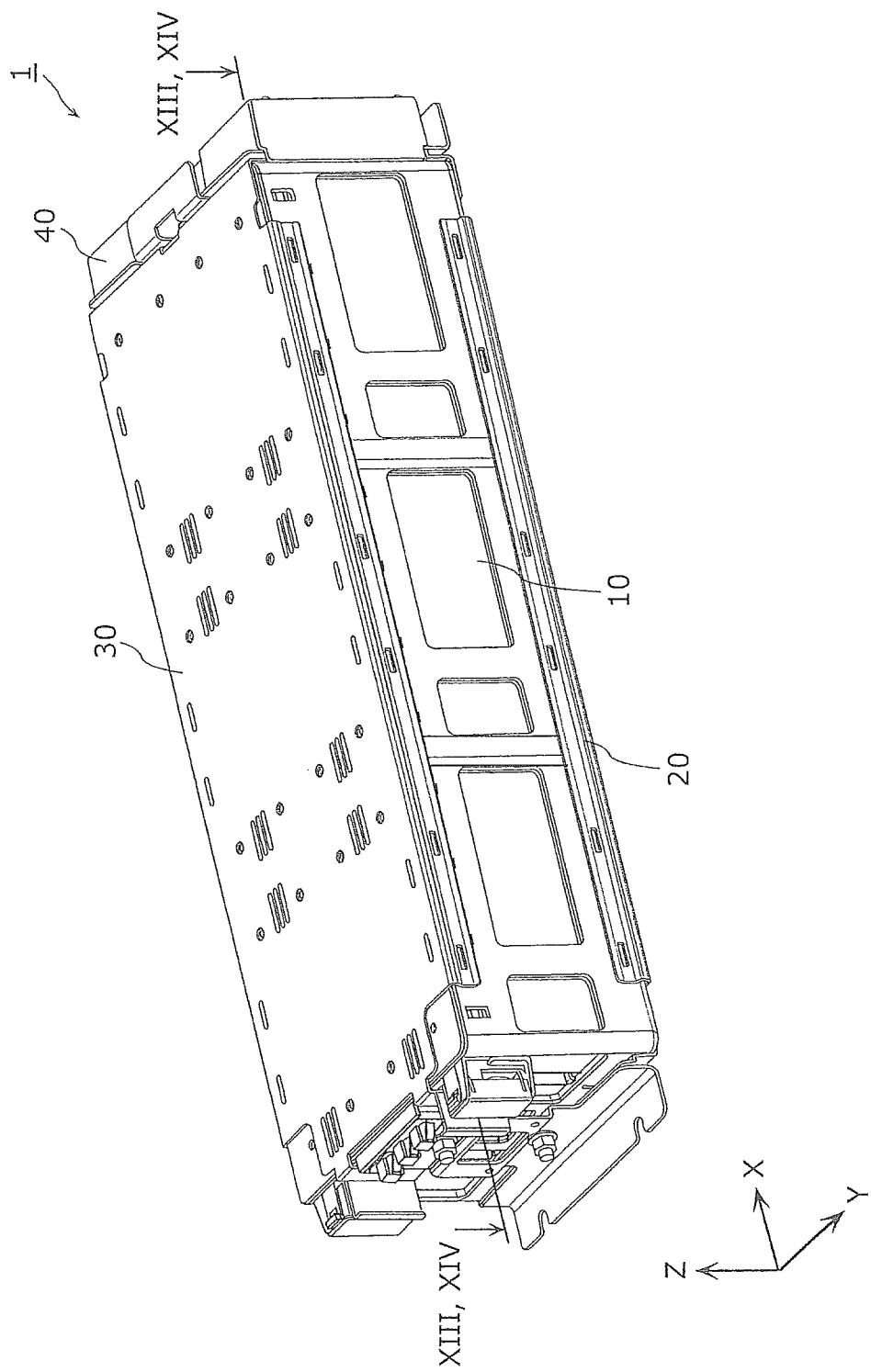
FIG. 1 is an external perspective view of an energy storage apparatus according to an embodiment of the present invention.

It is preferable that the configuration of an outer housing can be changed depending on design requirements such as electrical insulation and heat insulation. With the conventional configuration, when one configuration out of a plurality of configurations for the outer housing is selected in order to maintain the electrical and heat insulation of the battery cells, it is difficult to change the selected configuration of the outer housing to a different configuration.

The present invention was conceived in view of the above and aspects of the present invention provide an energy storage apparatus including an outer housing having increased design flexibility and a configuration that is changeable depending on design requirements.

An energy storage apparatus according to one aspect of the present invention includes: one or more energy storage devices, each energy storage device having a side surface; and an outer housing that houses the one or more energy storage devices. The outer housing includes an attachment portion for attaching a partition plate adjacently to the side surface of the one or more energy storage devices.

With this configuration, since the outer housing includes the attachment portion for attaching the partition plate adjacently to the side surface of the one or more energy storage devices, it is possible to selectively attach the partition plate to the outer housing. The partition plate can be selectively installed, or not installed, in the outer housing as needed. In this way, it is possible to flexibly alter the structure of the outer housing to suit the design requirements.

Moreover, the outer housing may include: a bottom surface; and a partition portion that extends from the bottom surface and is disposed adjacently to the side surface of the one or more energy storage devices. The outer housing may be configured such that the partition plate is disposed on an extension line of the partition portion.

With this configuration, since the outer housing includes the partition portion that extends from the bottom surface and is disposed adjacently to the side surface of the one or more energy storage devices, the one or more energy storage devices can easily be disposed in predetermined locations. In other words, the partition portion makes it possible to easily determine the positioning of the one or more energy storage devices in the outer housing.

Moreover, the partition portion may be continuously formed on the bottom surface and extend from a first side wall of the outer housing to a second side wall of the outer housing, the first and second side walls being opposite from each other and each being continuously formed on the bottom surface and intersecting the bottom surface.

With this configuration, since the partition portion is continuously formed on the bottom surface and extends from the first side wall of the outer housing to the second side wall of the outer housing, even if water from, for example, moisture, builds up on the first surface of the outer housing, it is possible to ensure electrical insulation of the container of the energy storage device and components disposed in the area surrounding the energy storage device (including the energy storage device).

Moreover, the attachment portion may include the partition portion, and the partition portion may include, at its tip end, a fitting portion for fitting a first end portion of the partition plate.

With this configuration, since the partition portion includes, in its tip end, a fitting portion for fitting a first end portion of the partition plate, it is possible to easily attach the partition plate to the outer housing simply by inserting the partition plate into the fitting portion of the partition portion.

Moreover, the outer housing may have an opening in a surface other than the bottom surface on which the partition portion is formed.

With this configuration, the opening is formed in the outer housing in a surface thereof other than the bottom surface on which the partition portion is formed. Since the opening is formed in the side wall and not in the vicinity of the partition portion, the strength of the partition portion can be maintained.

Moreover, the partition portion may be made of a material different from that of the partition plate.

Moreover, the energy storage apparatus may further include the partition plate that is detachably attached to the attachment portion.

With this configuration, since the partition plate is detachably attached to the attachment portion, the partition plate can be attached or detached flexibly as needed.

Moreover, the partition plate may include an insulating member.

With this configuration, since the partition plate includes an insulating member, it is possible to insulate the one or more energy storage devices both thermally and electrically.

Moreover, the energy storage apparatus may include the plurality of energy storage devices that are arranged in a line, and the attachment portion may be formed between the energy storage devices such that the partition plate is attachable to the attachment portion.

With this configuration, since the attachment portion is formed between the energy storage devices such that the partition plate is attachable to the attachment portion, it is possible to selectively attach the partition plate when increasing the heat insulation between the energy storage devices is required.

Moreover, the partition plate may have a recessed section at its first end portion, and the partition portion may include a protruding section that is engageable with the recessed section, the protruding section being formed in the partition portion.

With this, since the recessed section formed in the partition plate and the protruding section formed in the partition portion are engageable, it is possible to restrict the partition plate from moving along the length of the partition portion.

Moreover, the attachment portion may include a support portion in a position where at least one surface of the partition plate in a vicinity of its second end portion is abuttable.

This makes it possible for the attachment portion to prevent the partition plate from shifting to one side in a direction intersecting the partition plate, in at least the vicinity of its second end portion. Moreover, installation of the partition plate is simple since the support portion can be used as a guide when the partition plate is inserted into the groove of the partition portion.

Moreover, the support portion may have a groove for fitting a second end portion of the partition plate.

This makes it possible for the attachment portion to prevent the partition plate from shifting to either side in a direction intersecting the partition plate.

Moreover, the energy storage apparatus may further include an abutment member abutting the one or more energy storage devices. A second end portion of the partition plate may abut the abutment member.

With this configuration, since the partition plate spans the first axis width of the one or more energy storage devices, it is possible to increase the heat insulation between the one or more energy storage devices and conductive components.

Hereinafter, the energy storage apparatus according to an exemplary embodiment of the present invention is described in greater detail with reference to the accompanying drawings. It should be noted that the embodiment described below shows a preferred, specific example of the present invention. The numerical values, shapes, materials, structural elements, the arrangement and connection of the structural elements etc. shown in the following embodiment are mere examples, and therefore do not limit the present invention. Moreover, among the structural elements in the following embodiment, structural elements not recited in any one of the independent claims defining the most generic part of the inventive concept are described as arbitrary structural elements.

Embodiment

First, the configuration of an energy storage apparatus 1 will be described.

FIG. 1 is an external perspective view of the energy storage apparatus 1 according to the embodiment of the present invention.

Figure 2:
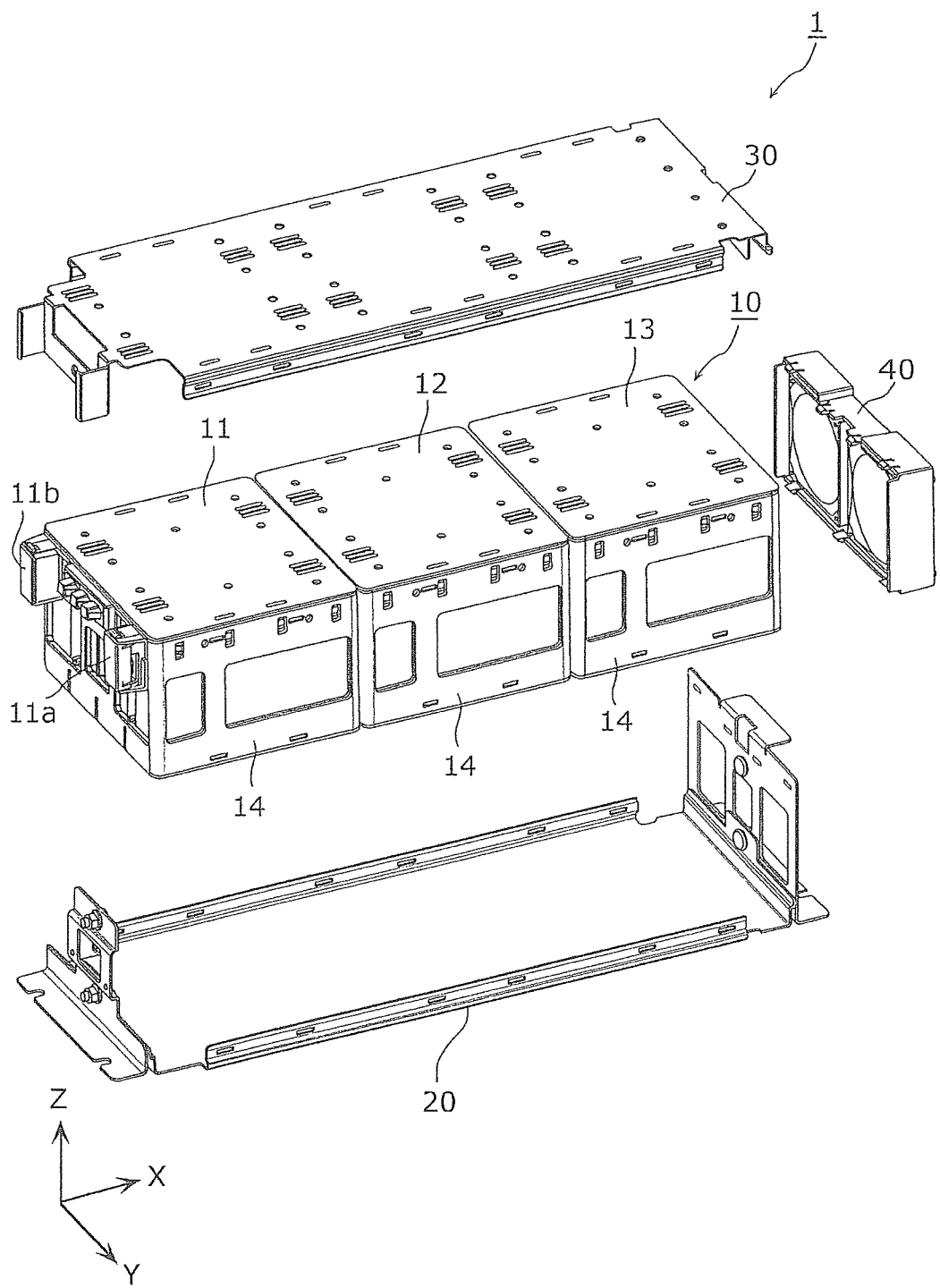
FIG. 2 is an exploded perspective view illustrating structural components of the energy storage apparatus.

FIG. 2 is an exploded perspective view illustrating structural components of the energy storage apparatus 1.

It should be noted that the Z axis, which is the first axis, is shown as being the vertical direction in FIG. 1 and FIG. 2. The Z axis is exemplified as being the vertical direction in the following description as well, but depending on the mode of use, it is conceivable that the Z axis may be a direction other than the vertical direction. As such, the Z axis is not limited to the vertical direction.

The energy storage apparatus 1 is an energy storage module capable of charging electricity from an external source and discharging electricity to an external device. The energy storage apparatus 1 is, for example, a high-voltage energy storage apparatus used to store energy and/or used as a power source.

As is illustrated in FIG. 1 and FIG. 2, the energy storage apparatus 1 includes a module group 10 including module units 11, 12, and 13, a lower coupling component 20, an upper coupling component 30, and a cooling apparatus 40. It should be noted that the energy storage apparatus 1 may include only one module unit.

The module units 11, 12, and 13 included in the module group 10 are aligned along the X axis. The module unit 11 includes an external positive terminal cover 11a which covers the external positive terminal (to be described later) and an external negative terminal cover 11b which covers the external negative terminal (to be described later). The energy storage apparatus 1 charges electricity from an external source and discharges electricity to an external device through the external positive terminal under the external positive terminal cover 11a and the external negative terminal under the external negative terminal cover 11b.

The module units 11, 12, and 13 are rectangular modules including one or more energy storage devices housed in a module case 14. Each of the module units 11, 12, and 13 has the same configuration. Moreover, the positive terminals and negative terminals of adjacent ones of the module units 11, 12, and 13 are electrically connected, whereby all energy storage devices in the module units 11, 12, and 13 are connected in series. The configuration of the module units 11, 12, and 13 will be described in detail later.

The lower coupling component 20 and the upper coupling component 30 are components which couple the module units 11, 12, and 13 together. The lower coupling component 20 couples the module units 11, 12, and 13 from below and the upper coupling component 30 couples the module units 11, 12, and 13 from above. In other words, fixing the lower coupling component 20 and the upper coupling component 30 together with the module units 11, 12, and 13 disposed therebetween couples the module units 11, 12, and 13 together.

More specifically, the lower coupling component 20 and the upper coupling component 30 are plate-like members formed, for example, from a conductive material such as metal. With this, the module units 11, 12, and 13 are firmly and securely fixed. It should be noted that since it is usually difficult to electrically insulate the surfaces of the lower coupling component 20 and the upper coupling component 30 with a coating, the lower coupling component 20 and the upper coupling component 30 have conductive properties.

Moreover, each module case 14 of the module units 11, 12, and 13 is mounted on the lower coupling component 20.

The cooling apparatus 40 is a fan that introduces a coolant into the module group 10. In other words, the cooling apparatus 40 draws in outside air (the coolant) from the end of the module group 10 in the negative direction of the X axis, and introduces air into each module case 14 of the module units 11, 12, and 13. The cooling apparatus 40 then expels the air from the end of the module group 10 in the positive direction of the X axis out the back of the cooling apparatus 40.

It should be noted that the cooling apparatus 40 may draw in outside air from the end of the module group 10 in the positive direction of the X axis and expel the air from the end of the module group 10 in the negative direction of the X axis. Moreover, the coolant introduced into the module group 10 by the cooling apparatus 40 is not limited to atmospheric air. For example, the coolant may be cold air chilled by a condenser. Furthermore, in the embodiment, the cooling apparatus 40 is provided with two fans, but number of fans the cooling apparatus 40 has is not limited to this example. Still further, the cooling apparatus 40 is not limited to the use of a fan. As long as it introduces the coolant into the module group 10, something other than a fan may be used.

Next, the configuration of the module units 11, 12, and 13 included in the module group 10 will be described in detail. It should be noted that each of the module units 11, 12, and 13 have the same configuration. As such, the following description focuses on the module unit 11, and descriptions of the module units 12 and 13 are omitted.

Figure 3:
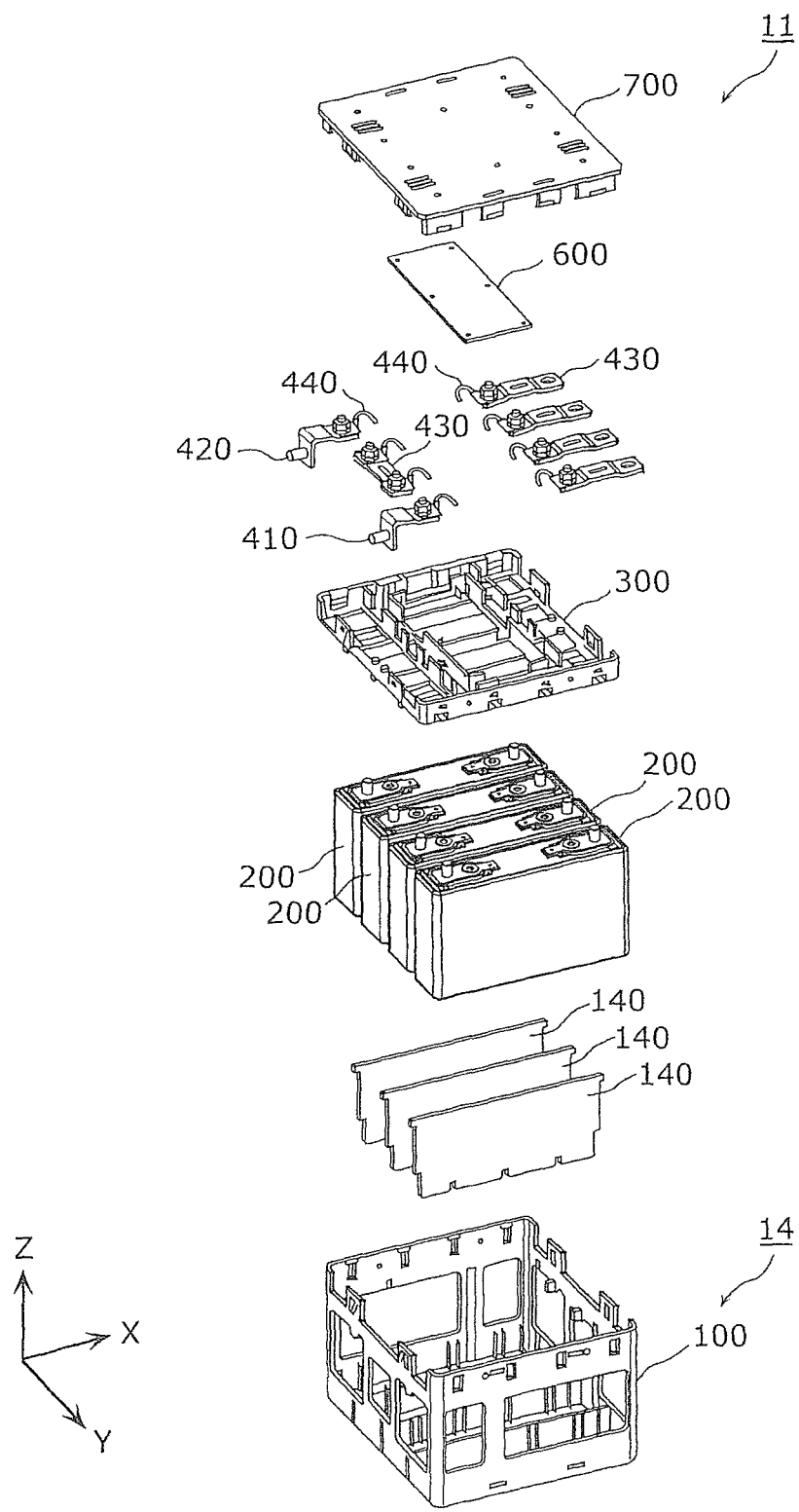
FIG. 3 is an exploded perspective view illustrating structural components of a module unit.

FIG. 3 is an exploded perspective view illustrating structural components of the module unit 11 according to the embodiment of the present invention.

As is illustrated in FIG. 3, the module unit 11 includes: the module case 14 including a case main body 100 and a cover 700; a plurality of energy storage devices 200 (in the embodiment, four of the energy storage devices 200 are provided) housed in the module case 14; a partition plate 140; an abutment member 300; bus bars 430, and a substrate 600. The plurality of energy storage devices 200 are aligned along the Y axis, which is the second axis. It should be noted that one energy storage device 200 may be housed in the module case 14 instead of a plurality of the energy storage devices 200.

The module case 14 is a rectangular (box-shaped) container acting as an outer housing for the module unit 11. The module case 14 arranges the energy storage devices 200 and the substrate 600 and such in given positions and protects the energy storage devices 200 and the substrate 600 and such from impact. The module case 14 is made of a material having insulating properties, such as a resin, like polycarbonate, for example. This prevents the energy storage device 200 and the substrate 600 and such from coming into contact with, for example, external metal components.

Here, the module case 14 includes the case main body 100 and the cover 700. The case main body 100 is a rectangular, tubular component having a bottom, and serves as the main body of the module case 14. The cover 700 is a low-profile, rectangular component that covers the opening of the case main body 100, and serves as the cover of the module case 14.

More specifically, the energy storage devices 200, the abutment member 300, and the bus bars 430 are arranged in this order in the case main body 100, and then the opening of the case main body 100 is closed off with the cover 700. Arranging the heavy energy storage devices 200 on the bottom in this way improves the stability of the module unit 11. The configuration of the case main body 100 will be described in detail later.

The partition plate 140 is a flat component disposed between the energy storage devices 200. The partition plate 140 is a component having electrical and heat insulating properties, and is formed, for example, by laminating sheets made of resin impregnated with a material such as fiberglass. It should be noted that the partition plate 140 is not limited to the above material, and may be formed of, for example resin that has at least either one of electrical or heat insulating properties. In other words, the partition plate 140 is a component disposed between the energy storage devices 200 to secure at least one of electrical and heat insulation between the energy storage devices 200. More specifically, the partition plate 140 is attached to an attachment portion 134 (to be described later) provided in the case main body 100.

The abutment member 300 is a low-profile, rectangular component located above the energy storage devices 200. The abutment member 300 is made of a material having insulating properties, such as resin. Here, the abutment member 300 is a component that abuts the side of the energy storage devices 200 in the positive direction of the Z axis. Moreover, the abutment member 300 may have a function of restricting the positioning of the energy storage devices 200 included in the case main body 100. More specifically, the abutment member 300 may fit inside the case main body 100 and hold down the energy storage devices 200 from above to fix the energy storage devices 200 to the case main body 100.

The substrate 600 is mounted on the abutment member 300. In this way, the abutment member 300 functions as a mounting plate for the substrate 600 in addition to functioning to fix the energy storage devices 200 to the case main body 100.

The bus bars 430 are arranged above the abutment member 300. The bus bars 430 are made of a conductive material, such as metal, and electrically connect the energy storage devices 200 together. More specifically, the bus bar 430 connects the positive terminal or negative terminal of one of two adjacently arranged energy storage devices 200 to the negative terminal or positive terminal of the other of the two adjacently arranged energy storage devices 200.

The module unit 11 moreover includes an external positive terminal 410 arranged in the external positive terminal cover 11a and an external negative terminal 420 arranged in the external negative terminal cover 11b. The external positive terminal 410 and the external negative terminal 420 are electrode terminals for charging the energy storage apparatus 1 with electricity from an external source and discharging electricity to an external device. In other words, the energy storage apparatus 1 is charged with electricity from an external source and discharges electricity to an external device via the external positive terminal 410 and the external negative terminal 420.

The substrate 600 is a substrate capable of obtaining, monitoring, and controlling the state of the energy storage devices 200, and is connected to the energy storage devices 200 via wiring 440. Here, the wiring 440 is a lead wire connecting the positive terminal 230 or the negative terminal 240 of the energy storage device 200 to the substrate 600. It should be noted that the illustration of the wiring 440 is partially omitted in FIG. 3.

More specifically, the substrate 600 is a control substrate for obtaining and monitoring, for example, the charging state and discharging state (the state of the battery, such as voltage or temperature) of the energy storage devices 200. The substrate 600 is provided with a control circuit (not shown in the drawings) for performing the above-described monitoring, controlling the on and off states of a relay, or communicating with other devices.

The substrate 600 is located on the abutment member 300, and arranged so as to be covered by the cover 700. In other words, the substrate 600 is arranged so as to be protected by the abutment member 300 and the cover 700 as a result of being sandwiched between the abutment member 300 and the cover 700. Moreover, integrating the electrical components in the upper portion of the energy storage apparatus 1 makes assembly and maintenance of the energy storage apparatus 1 easier.

Next, the configuration of the energy storage device 200 will be described in detail.

Figure 4:
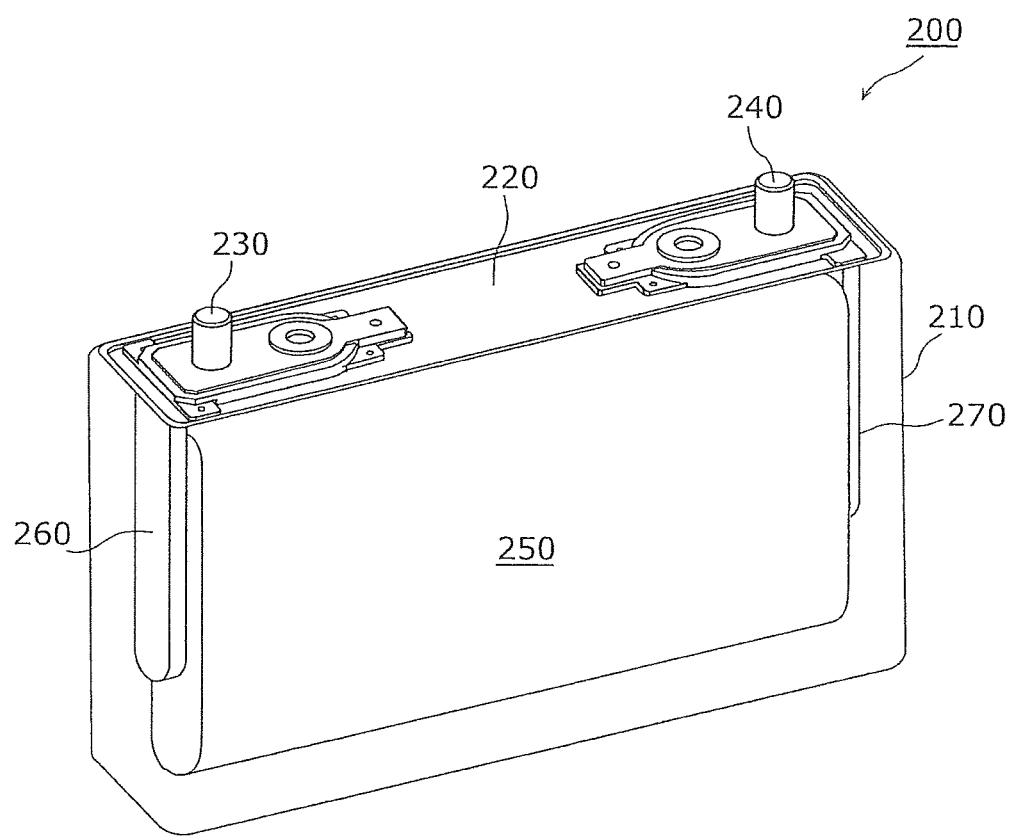
FIG. 4 is a transparent perspective view illustrating the inside of an energy storage device.
Figure 5:
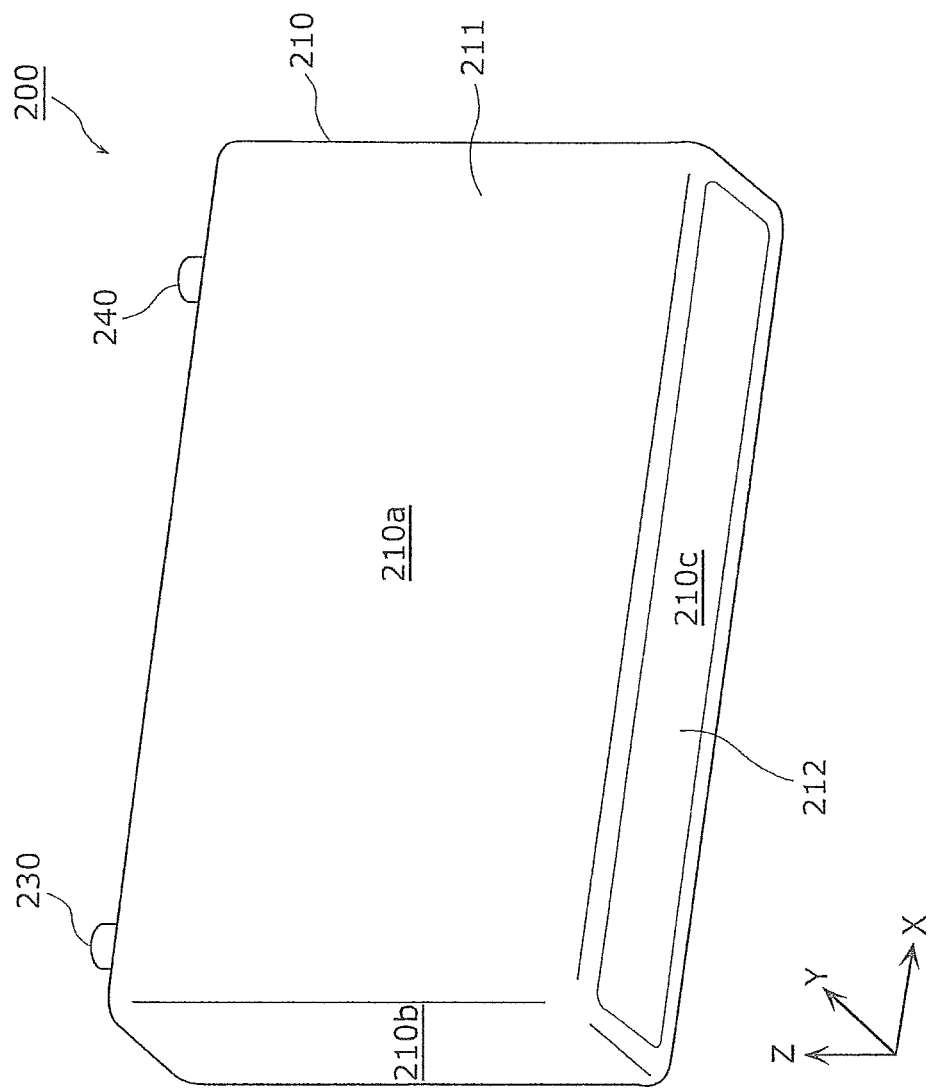
FIG. 5 is an external perspective view of the energy storage device from below.

FIG. 4 is a transparent perspective view illustrating the inside of the energy storage device 200 according to the embodiment of the present invention. FIG. 5 is an external perspective view of the energy storage device 200 from below.

The energy storage device 200 is a secondary battery (battery cell) capable of charging and discharging electricity. More specifically, the energy storage device 200 is a non-aqueous electrolyte secondary battery such as a lithium ion secondary battery. It should be noted that the energy storage device 200 is not limited to a non-aqueous electrolyte secondary battery. The energy storage device 200 may be a secondary battery other than a non-aqueous electrolyte secondary battery, such as a capacitor.

First, as is illustrated in FIG. 4, the energy storage device 200 includes a container 210, the positive terminal 230, and the negative terminal 240. The container 210 includes, as a top wall, a container lid 220. Additionally, an electrode assembly 250, a positive current collector 260, and a negative current collector 270 are arranged in the container 210. It should be noted that even though it is not shown in the drawings, the container 210 contains a liquid such as an electrolyte.

The container 210 is configured of a rectangular, tubular metal chassis main body having a bottom, and a container lid 220, which is metallic and hermetically seals the opening of the chassis main body. Moreover, after insertion of the electrode assembly 250 and such, the inside of the container 210 is sealed by, for example, welding the container lid 220 to the chassis main body. It should be noted that the material used for the container 210 is not particularly limited to a certain material, but is preferably a weldable metal such as stainless steel or aluminum.

As is illustrated in FIG. 5, the container 210 includes a sheet 211 that has insulating properties and covers the battery side surfaces 210a and 210b, and a sheet 212 that has insulating properties and covers the battery bottom surface 210c. Here, the battery side surface 210a is the long side surface of the container 210, the battery side surface 210b is the short side surface of the container 210, and the battery bottom surface 210c is the bottom surface of the container 210.

In other words, the sheet 212 is an insulation sheet that, by covering the battery bottom surface 210c, maintains electrical insulation and protects the battery bottom surface 210c from being scratched. The sheet 211 is an insulation sheet that, by covering the battery side surfaces 210a and 210b, which are the side surfaces adjacent to the battery bottom surface 210c, without covering the battery bottom surface 210c, maintains electrical insulation and protects the battery side surfaces 210a and 210b from being scratched.

With this configuration, a gap is present at the perimeter of the battery bottom surface 210c, at the boundary of the sheet 211 and the sheet 212. It should be noted that the sheet 211 and the sheet 212 are not required to have electrical insulating properties. Even in this case, the sheet 211 and the sheet 212 are effective in preventing scratches.

Returning to FIG. 4, the electrode assembly 250 is a power generating element capable of storing electricity, and includes a positive electrode, a negative electrode, and a separator. More specifically, the electrode assembly 250 is a wound electrode assembly formed by winding, into an oblong shape, a laminate including the negative electrode, the positive electrode, and the separator interposed therebetween. It should be noted that the electrode assembly 250 may be a stacked electrode assembly in which flat electrode plates are layered.

Here, the positive electrode is a long, belt-shaped positive electrode base material foil made of aluminum or an aluminum alloy with a positive electrode active material layer formed on a surface thereof. The negative electrode is a long, belt-shaped negative electrode base material foil made of copper or a copper alloy with a negative electrode active material layer formed on a surface thereof. The separator is a microporous sheet. It should be noted that the positive electrode, the negative electrode, and the separator used in the energy storage device 200 are not particularly different from conventional positive electrodes, negative electrodes, and separators, and so long as the performance of the energy storage device 200 is not inhibited, well-known materials may be used. Moreover, so long as it does not inhibit the performance of the energy storage device 200, the electrolyte (non-aqueous electrolyte) enclosed in the container 210 is not particular limited to a certain type; a variety of electrolytes may be used.

The positive terminal 230 is an electrode terminal that is electrically connected to the positive electrode in the electrode assembly 250 via the positive current collector 260, and the negative terminal 240 is an electrode terminal that is electrically connected to the negative electrode in the electrode assembly 250 via the negative current collector 270. Both the positive terminal 230 and the negative terminal 240 are connected to the container lid 220. In other words, the positive terminal 230 and the negative terminal 240 are metallic electrode terminals for leading electricity stored in the electrode assembly 250 out of the energy storage device 200 and introducing electricity into the energy storage device 200 to be stored in the electrode assembly 250.

More specifically, among the energy storage devices 200 included in the energy storage apparatus 1, the positive terminal 230 of the energy storage device 200 positionally corresponding to the external positive terminal 410 is connected to the external positive terminal 410, and the negative terminal 240 of the same energy storage device 200 is connected to the positive terminal 230 of an adjacent energy storage device 200. Similarly, among the energy storage devices 200 included in the energy storage apparatus 1, the negative terminal 240 of the energy storage device 200 positionally corresponding to the external negative terminal 420 is connected to the external negative terminal 420, and the positive terminal 230 of the same energy storage device 200 is connected to the negative terminal 240 of an adjacent energy storage device 200. The positive terminal 230 or the negative terminal 240 of other energy storage devices 200 are connected to the negative terminal 240 or the positive terminal 230 of an adjacent energy storage device 200.

The positive current collector 260 is a rigid component having conductive properties that is electrically connected to the positive terminal 230 and the positive electrode, and positioned between the positive electrode of the electrode assembly 250 and a side wall of the container 210. It should be noted that, similar to the positive electrode current collector foil of the positive electrode, the positive current collector 260 is made of aluminum. Moreover, the negative current collector 270 is a rigid component having conductive properties that is electrically connected to the negative terminal 240 and the negative electrode of the electrode assembly 250, and positioned between the negative electrode of the electrode assembly 250 and a side wall of the container 210. It should be noted that, similar to the negative electrode current collector foil of the negative electrode, the negative current collector 270 is made of copper.

Next, the case main body 100 of the module case 14 will be described in detail.

Figure 6:
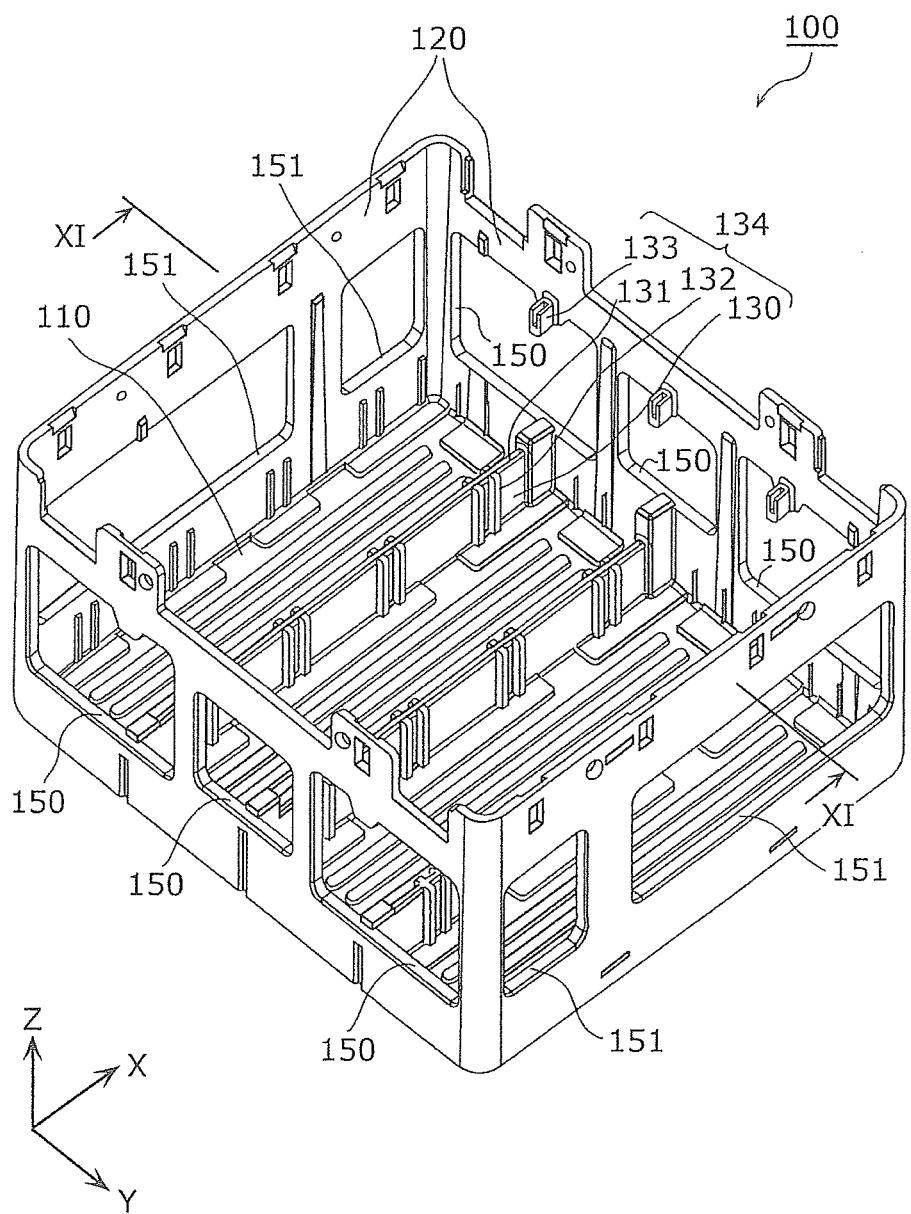
FIG. 6 is a perspective view illustrating a configuration of a case main body.
Figure 7:
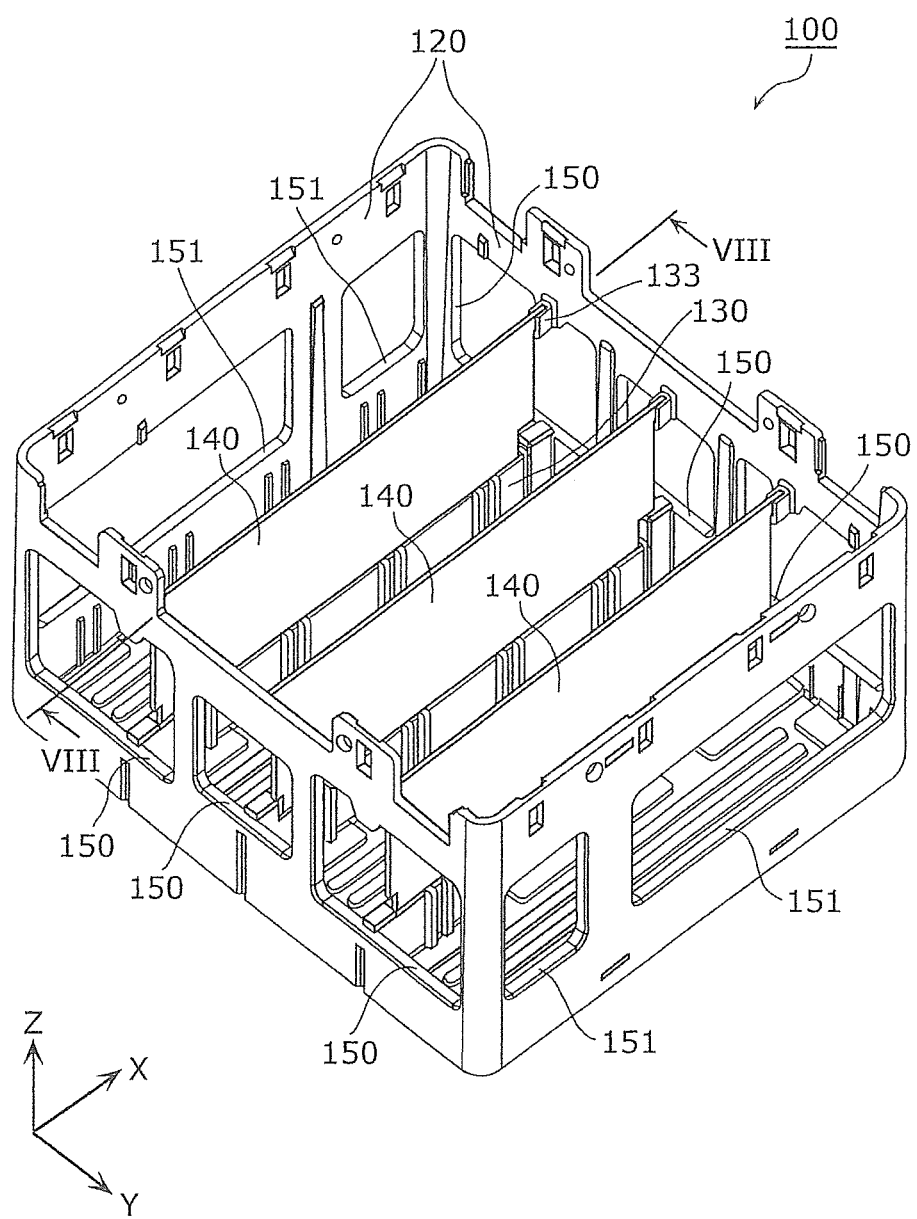
FIG. 7 is a perspective view illustrating a configuration in which partition plates are attached to the case main body.

FIG. 6 is a perspective view illustrating the configuration of the case main body 100 according to the embodiment of the present invention. FIG. 7 is a perspective view illustrating the configuration in which the partition plates 140 are attached to the case main body 100.

As is illustrated in FIG. 6 and FIG. 7, the case main body 100 includes a case bottom portion 110, a case side wall portion 120, and a plurality of partition portions 130, and is a rectangular, tubular component having a bottom and an opening in the upper portion. The energy storage devices 200 are inserted through the opening in the upper portion of the case main body 100 and housed in the case main body 100.

In the embodiment, the energy storage devices 200 are housed in the case main body 100 such that the container lid 220 faces upward (the positive direction of the X axis). In other words, the energy storage devices 200 are housed in the case main body 100 such that the battery bottom surfaces 210c of the energy storage devices 200 are opposed to the case bottom portion 110 and the battery side surfaces 210a and 210b of the energy storage devices 200 are opposed to the case side wall portion 120, the partition portions 130, and the partition plates 140.

The case bottom portion 110 is the bottom surface of the case main body 100, and is a flat, rectangular component. The case side wall portion 120 is a four-cornered tubular component made from four flat, rectangular side walls that cover the four sides of the case bottom portion 110. In other words, the case main body 100 of the module case 14 includes the case bottom portion 110 as the bottom surface and a plurality of the partition portions 130 that extend from the case bottom portion 110 and are disposed adjacently to the side surfaces of the energy storage devices 200 so as to partition the bottom end portions of the energy storage devices 200. The partition portions 130 are flat, rectangular components for partitioning the energy storage devices 200 disposed in the case main body 100. Each of the partition portions 130 is continuous from, among the four rectangular, flat side walls of the case side wall portion 120, one of the pair of side walls facing the direction of the X axis to the other. In other words, partition portions 130 are continuously formed on the bottom surface and extend from a first side wall of the module case 14 to a second side wall of the module case 14, which are opposite from each other. The first and second walls are each continuously formed on the bottom surface and intersect the bottom surface. Moreover, each of the pair of side walls has openings 150, and among the four rectangular, flat side walls of the case side wall portion 120, each side wall in the pair of side walls facing the direction of the Y axis has openings 151.

The case main body 100 includes the attachment portions 134 for attachment of the partition plates 140 to the case main body 100.

The attachment portions 134, more specifically, include the partition portions 130. Each partition portion 130 includes, at its tip end, as the fitting portion, a groove 131 for fitting the end portion 142 of each partition plate 140. Moreover, the partition portions 130 include, on both side surfaces, protrusions 132. When the energy storage devices 200 are housed in the case main body 100, the protrusions 132 restrict the positions of the energy storage devices 200 along the Y axis by abutting the battery side surfaces 210a of the energy storage devices 200. Moreover, the protrusions 132 have a function of preventing the partition portions 130 from warping.

The attachment portions 134 may further include pairs of support portions 133 formed in portions of the case side wall 120 located in the positive direction of the Z axis, from both X axis sides of the partition portions 130. The pairs of support portions 133 positionally correspond to respective partition portions 130 Each support portion 133 has a groove 133a for fitting a protrusion 141, which is a second end portion of the partition plate 140. In other words, each of the partition plates 140 attaches to the case main body 100 by being inserted and engaging with the groove 131 formed in the partition portion 130 and the groove 133a formed in the support portion 133. It should be noted that the support portion 133 may be formed on only one of the two sides facing the direction of the X axis instead of on both sides.

Figure 8:
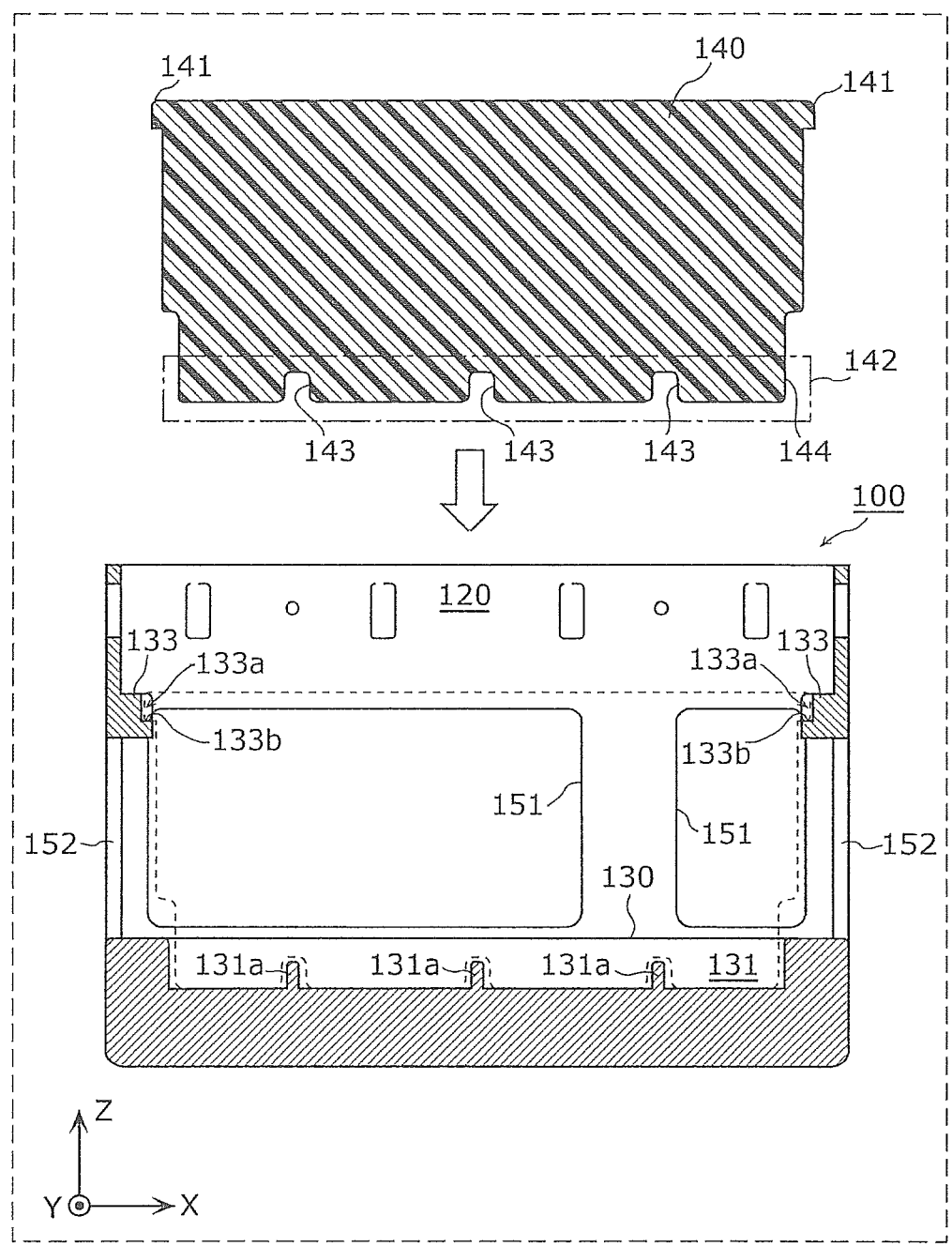
FIG. 8 is a cross sectional view at the line VIII-VIII illustrated in FIG. 7 of the case main body with the partition plate to be attached thereto.

FIG. 8 is a cross sectional view at the line VIII-VIII illustrated in FIG. 7 of the case main body 100 with the partition plate 140 attached thereto and a side portion 152 of the case side wall portion 120.

As is illustrated in FIG. 8, the partition plate 140 includes the pair of protrusions 141 in the end portion in the positive direction of the Z axis. The protrusions extend from both sides in the direction of the X axis. Moreover, the partition plate 140 has a plurality of cut-out sections 143 and cut-out sections 144 (recessed sections) at its first end portion. The case main body 100 is provided with (i) the support portions 133 including the grooves 133a for engaging the pair of protrusions 141 of the partition plate 140 and (ii) the partition portion 130 including the groove 131 in which the end portion 142 of the partition plate 140 in the negative direction of the Z axis is inserted. Moreover, the partition portion 130 of the case main body 100 includes ridges 131a (protruding sections) for further engagement with the cut-out sections 143 of the partition plate 140.

It should be noted that the groove 133a formed in the support portion 133 includes a bottom surface 133b that supports the side of the protrusion 141 of the partition plate 140 located in the negative direction of the Z axis. In other words, compared to when the partition plate 140 is supported only by the groove 131 of the partition portion 130, the partition plate 140 can also be supported at the protrusion 141 formed at the end portion of the partition plate 140 in the positive direction of the Z axis. This makes it possible to prevent warping where the end portion located on the side of the partition plate 140 in the positive direction of the Z axis moves closer to the end portion located in the negative direction of the Z axis.

Figure 9:
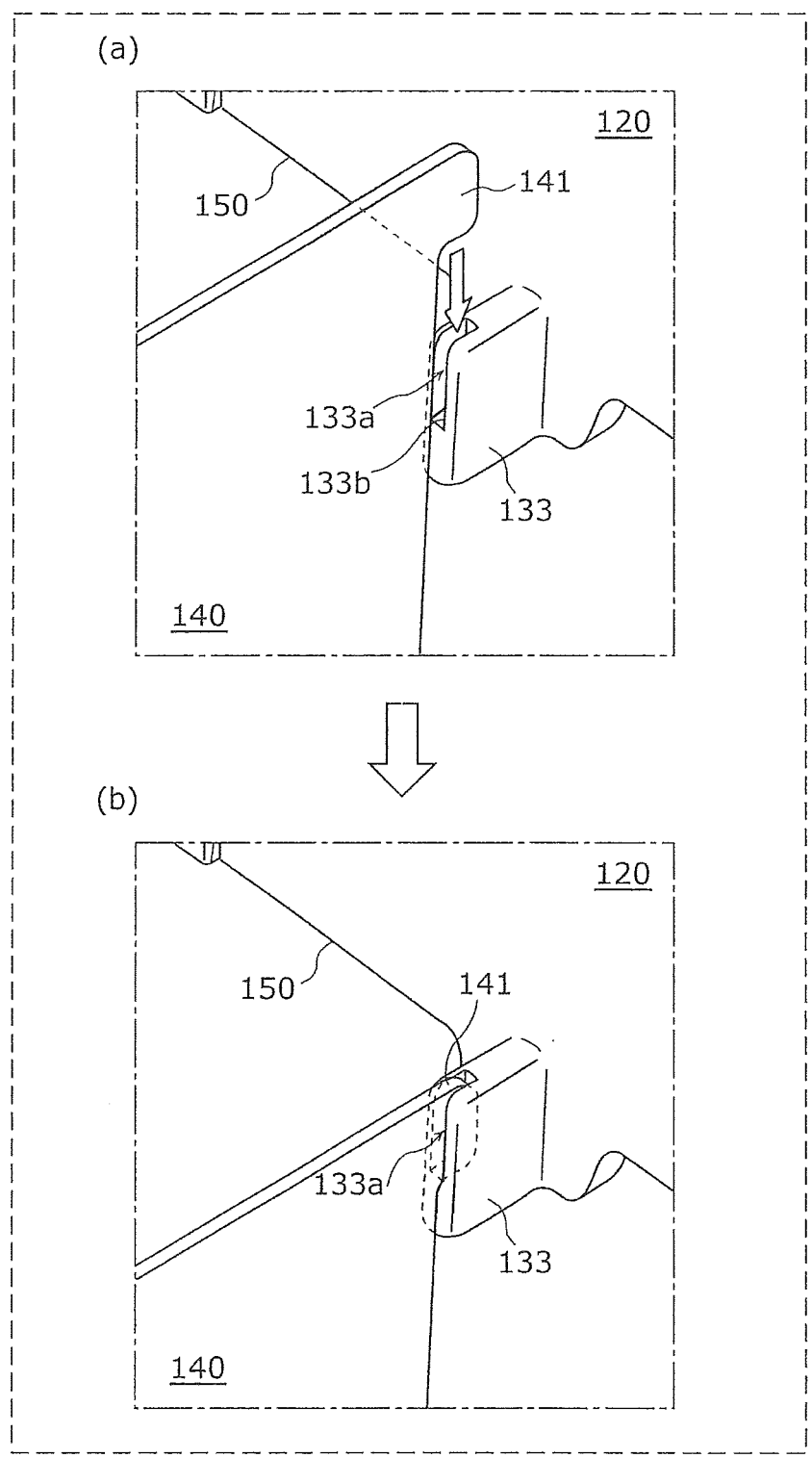
FIG. 9 is an enlarged view illustrating how the partition plate attaches to a support portion of the case main body.
Figure 10:
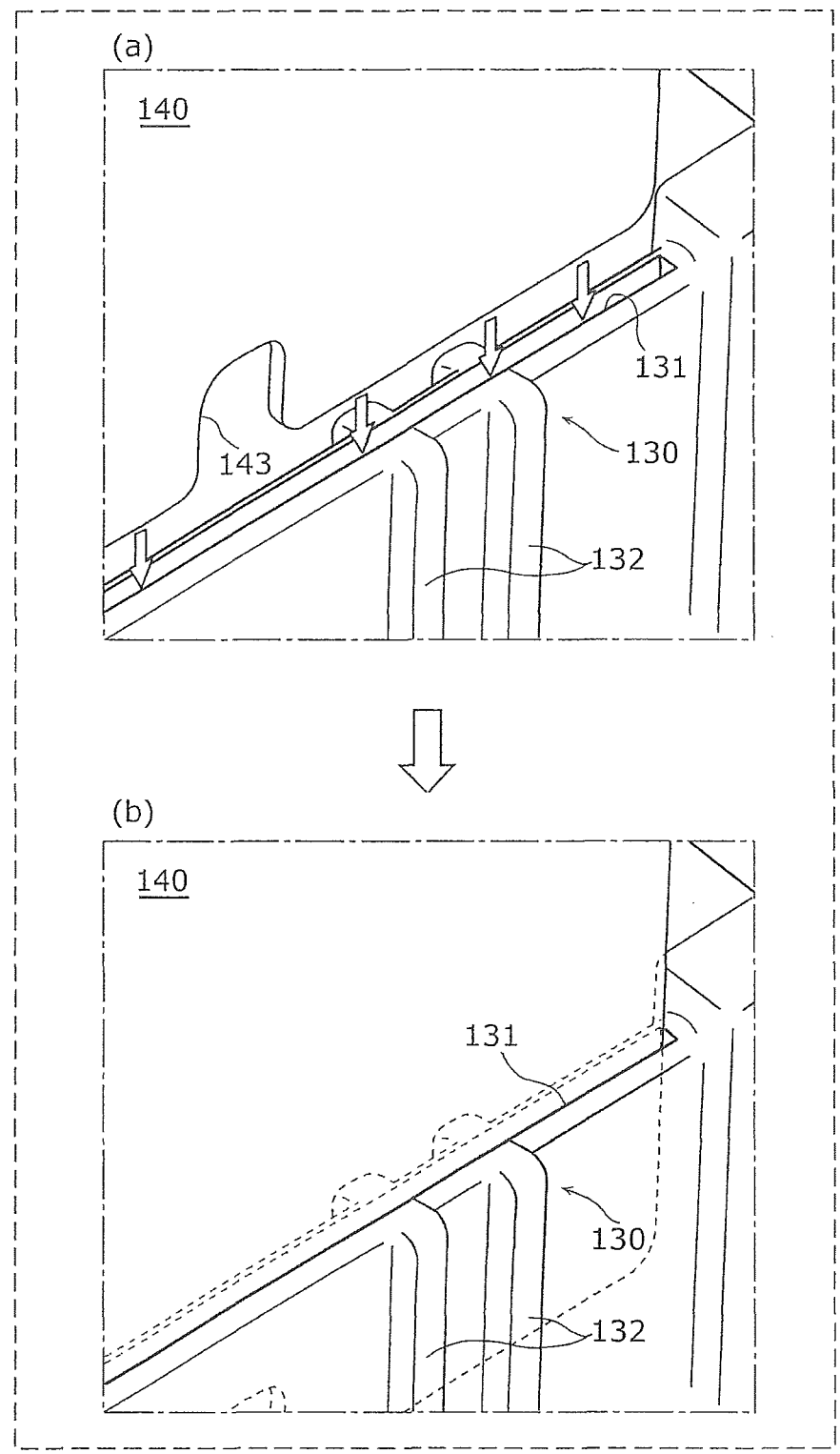
FIG. 10 is an enlarged view illustrating how the partition plate attaches to a partition portion of the case main body.

FIG. 9 is an enlarged view illustrating how the partition plate 140 attaches to the support portion 133 of the case main body 100 according to the embodiment of the present invention. FIG. 10 is an enlarged view illustrating how the partition plate 140 attaches to the partition portion 130 of the case main body 100.

In FIG. 9, (a) illustrates the state before the partition plate 140 is inserted into the groove 133a of the support portion 133, and (b) illustrates the state after the partition plate 140 is inserted into the groove 133a of the support portion 133. As is illustrated in (a) in FIG. 9, the protrusion 141 of the partition plate 140 slides into the groove 133a of the support portion 133 provided on the case side wall 120 of the case main body 100. As is illustrated in (b) in FIG. 9, the partition plate 140 and the groove 133a of the support portion 133 are engaged while the side of the protrusion 141 of the partition plate 140 located in the negative direction of the Z axis abuts the bottom surface 133b of the groove 133a.

In FIG. 10, (a) illustrates the state before the partition plate 140 is inserted into the groove 131 of the partition portion 130, and (b) illustrates the state after the partition plate 140 is inserted into the groove 131 of the partition portion 130. As is illustrated in (a) in FIG. 10, the end portion 142 of the partition plate 140 located in the negative direction of the Z axis slides into the groove 131 of the partition portion 130 of the case main body 100. As is illustrated in (b) in FIG. 10, the partition plate 140 and the groove 131 of the partition portion 130 are engaged while the end portion 142 of the partition plate 140 abuts the bottom surface of the groove 131.

In this way, the partition plate 140 engages with the grooves 131 and 133a formed in the partition portion 130 and the support portion 133, respectively, which are included in the attachment portion 134 of the case main body 100, to attach to the case main body 100. In other words, the partition plate 140 is detachably attached to the attachment portion 134 of the case main body 100.

Figure 11:
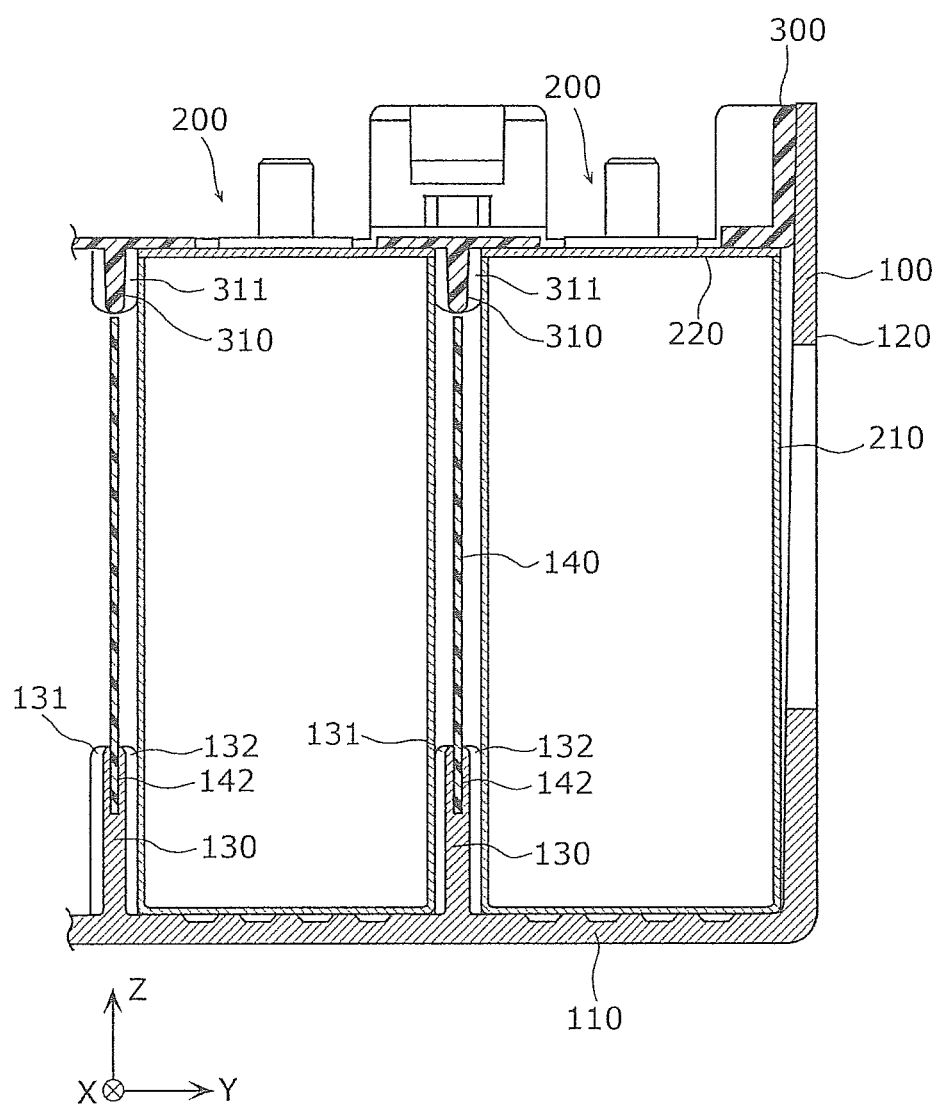
FIG. 11 is a cross sectional view at the line XI-XI illustrated in FIG. 6 of the case main body with the energy storage devices, the partition plates, and the abutment member disposed therein.

FIG. 11 is a cross sectional view at the line XI-XI illustrated in FIG. 6 of the case main body 100 with the energy storage devices 200, the partition plates 140, and the abutment member 300 disposed therein.

As is illustrated in FIG. 11, the abutment member 300 includes a partition portion 310 that is positioned between the energy storage devices 200 and extends in the negative direction of the Z axis. A rectangular protrusion 311 is formed on both side surfaces of the partition portion 310 formed on the abutment member 300, similar to the protrusions 132 of the partition portions 130 formed on the case main body 100. The protrusions 311 restrict the positions of the energy storage devices 200 along the Y axis by abutting the battery side surfaces 210a of the energy storage devices 200. Moreover, the protrusions 311 have a function of preventing the partition portions 310 from warping.

While the partition plate 140 is installed in the attachment portion 134 of the case main body 100, the end portion of the partition plate 140 located in the positive direction of the Z axis extends to the vicinity of the end portion of the partition portion 310 of the abutment member 300 located in the negative direction of the Z axis. It should be noted that the end portion of the partition plate 140 located in the positive direction of the Z axis may abut the end portion of the partition portion 310 of the abutment member 300 located in the negative direction of the Z axis. In this way, since the partition plates 140 are disposed between the energy storage devices 200 across the Z axis direction, electrical and heat insulation between the energy storage devices 200 can be, with certainty, increased. Moreover, by abutting the abutment member 300 with the partition plate 140, the partition plate 140 can easily be secured, and vibration of the partition plate 140 can be prevented.

Next, an application example of the energy storage apparatus 1 will be given. FIG. 12 is a perspective view illustrating the configuration of a battery pack 2 including the energy storage apparatus 1 according to the embodiment of the present invention.

As is illustrated in FIG. 12, the battery pack 2 is a large power source apparatus in which a plurality of energy storage apparatuses 1 (for example, ten to forty) are arranged in an array. The battery pack 2 is used to store energy and/or used as a power source, for example. The battery pack 2 includes a plurality of the energy storage apparatuses 1 and a pack case 2a that houses the plurality of energy storage apparatuses 1.

The external positive terminals 410 and external negative terminals 420 of adjacent ones of the energy storage apparatuses 1 are electrically connected together to form the high-voltage battery pack 2. It should be noted that the number of energy storage apparatuses 1 included in the battery pack 2 is not particularly limited to a given number.

(Distinguishing Characteristics)

As described above, with the energy storage apparatus 1 according to the embodiment of the present invention, since the case main body 100 of the module case 14 is provided with the attachment portions 134 for attaching the partition plates 140 between the energy storage devices 200, it is possible to selectively attach the partition plates 140 to the case main body 100. By installing the partition plates 140, the module case 14 has a structure in which the transfer of heat from the energy storage devices 200 to nearby components (in particular, to an adjacent energy storage device) is inhibited. Moreover, since the partition plate 140 has insulating properties, it is possible to improve the insulation of the heat from the energy storage devices 200 and the electrical insulation of the energy storage devices 200. As such, it is possible to select whether to install or not to install the partition plates 140 in the case main body 100 of the module case 14 based on necessity with regard to the insulation of the heat from the energy storage devices 200 and the electrical insulation of the energy storage devices 200. In this way, it is possible to flexibly alter the structure of the module case 14 to suit the design requirements.

Moreover, since the partition plates 140 are provided to be detachably attachable to the plurality of pairs of attachment portions 134 in the case main body 100 of the module case 14, it is possible to remove a partition plate 140 as needed with regard to electrical or heat insulation. This makes it possible to increase the design flexibility of the module case 14.

Figure 13:
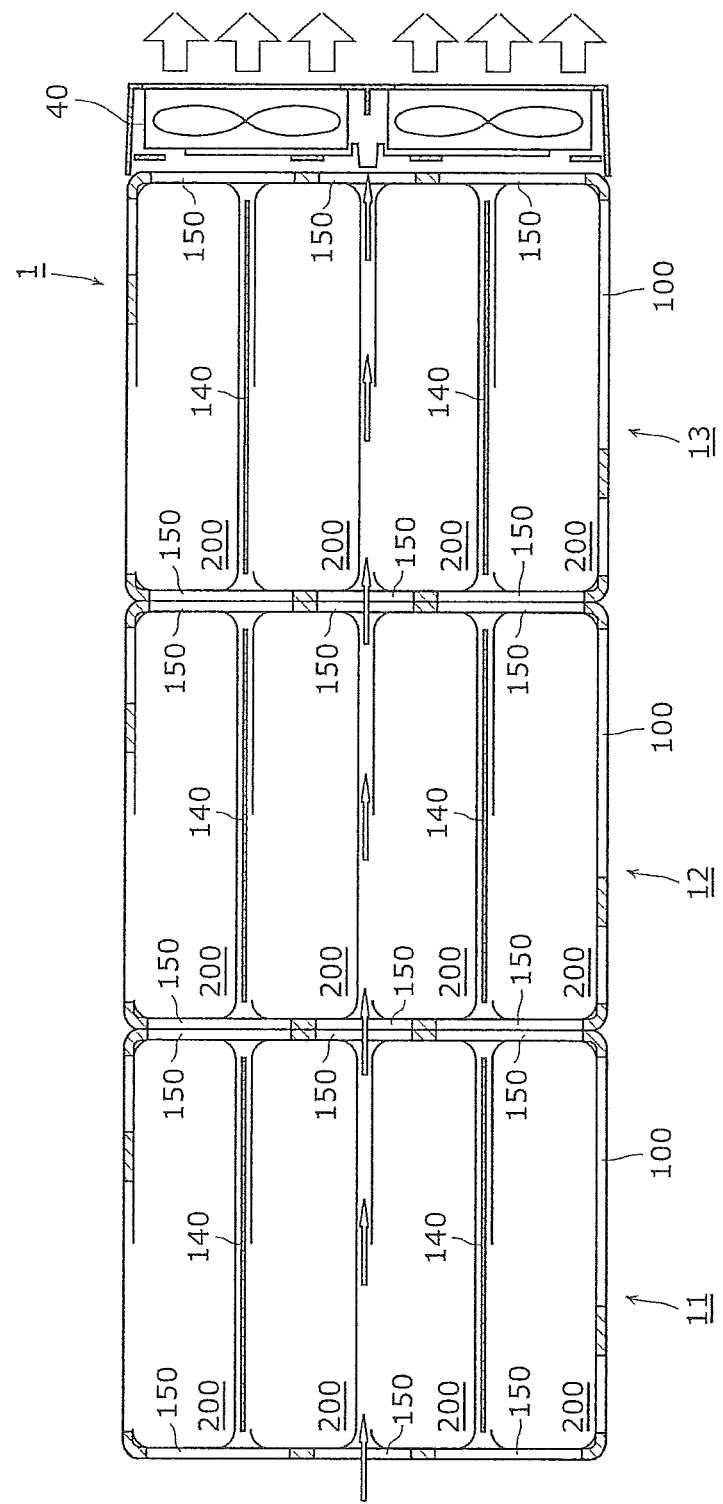
FIG. 13 is a cross sectional view of the energy storage apparatus at the line XIII-XIII in FIG. 1, illustrating the flow of air generated by a cooling apparatus when the partition plates are not provided in the center in the Y axis direction.

FIG. 13 is a cross sectional view of the energy storage apparatus 1 at the line XIII-XIII in FIG. 1, illustrating the flow of air generated by the cooling apparatus 40 when the partition plates are not provided in the center in the Y axis direction.

As is illustrated in FIG. 13, the cooling apparatus 40 generates the flow of air along the X axis. Moreover, each side wall in the pair of side walls facing the direction of the X axis among the case side walls 120 of the case main body 100 of each of the module units 11, 12, and 13 have openings 150 for allows air flow generated by the cooling apparatus 40 to pass. Moreover, each side wall in the pair of side walls facing the direction of the Y axis among the case side walls 120 of the case main body 100 has openings 151. In other words, the case main body 100 has openings 150 and 151 formed in the case side wall portion 120, which is different from the case bottom portion 110 on which the partition portions 130 are formed. In this way, since the openings 150 and 151 are formed in the case side wall portion 120, which is different from the case bottom portion 110 on which the partition portions 130 are formed, and not in the vicinity of the partition portions 130, it is possible to maintain the strength of the partition portions 130.

Furthermore, the plurality of openings 150 provided in the pair of side walls facing the direction of the X axis are formed positionally opposed to each other. The openings 150 are also provided corresponding to the positions of the attachment portions 134 for attaching the partition plates 140. In other words, the flow of air along the X axis generated by the cooling apparatus 40 passes between the energy storage devices 200. Here, when a plurality of the partition plates 140 are attached to the attachment portions 134 in the case main body 100, since the space between the energy storage devices 200 narrows, the drop in pressure when the space is used as the flow path is greater than when the plurality of partition plates 140 are not provided. In other words, in the spaces between the energy storage devices 200, air can flow more easily in spaces where the partition plates 140 are not provided than spaces where the partition plates 140 are provided. In this way, especially since the pair of side walls facing the direction of the X axis in the case side wall portion 120 have the openings 150, when the energy storage devices 200 are cooled, it is possible for the coolant to flow (in this embodiment, air) through the openings 150. In other words, since the openings 150 are formed in a surface that is not the surface on which the partition portions 130 are formed, the openings are not obstructed by the partition portions, even more so than when the partition portions and the openings are formed on the same surface. As such, it is possible to form the openings to be large, and especially when a partition plate is not attached to a partition portion, the cooling performance can be markedly increased. It should be noted that in the embodiment, the case side wall portion 120 has a plurality of openings 150 and 151, but the number is not limited to more than one; advantageous effects can still be achieved even with only one opening.

On the other hand, with the energy storage apparatus 1, it is more difficult to transfer heat to the outside for more inward positioned energy storage devices 200, meaning they are more likely to increase in temperature. In other words, in each of the module units 11, 12, and 13, the two energy storage devices 200 located in the center in the Y axis direction are more prone to increasing in temperature. It is not preferable when some energy storage devices 200 get hotter than other energy storage devices 200 as this leads to a disparity in operation life and storage capacity of the energy storage devices. With the energy storage apparatus 1 according to the embodiment of the present invention, since the partition plate 140 is detachably attachable to the attachment portion 134, it is possible to remove only the center partition plate 140 in the Y axis direction. With this, for example, by forming a configuration in which the partition plate. 140 is not attached to the middle attachment portion 134 in the Y axis direction, a large amount of air can flow between the two energy storage devices disposed in the center in the Y axis direction, thereby efficiently cooling these two energy storage devices, as is illustrated in FIG. 13. This makes it possible to reduce disparities in temperature of the plurality of energy storage devices 200, and therefore reduce disparities in operational life and storage capacity of the energy storage devices.

Figure 14:
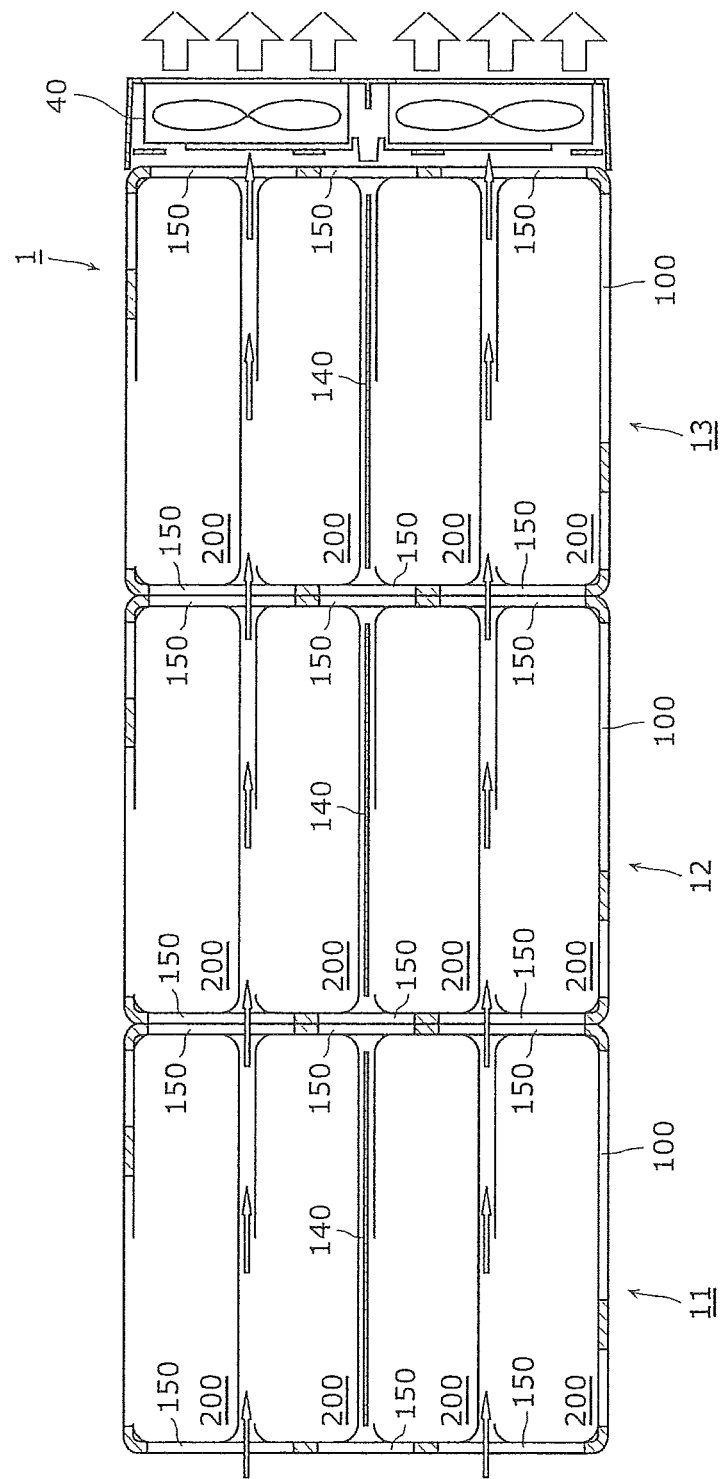
FIG. 14 is a cross sectional view of the energy storage apparatus at the line XIV-XIV in FIG. 1, illustrating the flow of air generated by the cooling apparatus when the partitions plates are only provided in the center in the Y axis direction.

It is also possible to form the configuration illustrated in FIG. 14, which shows a different perspective.

FIG. 14 is a cross sectional view of the energy storage apparatus 1 at the line XIV-XIV in FIG. 1, illustrating the flow of air generated by the cooling apparatus 40 when the partition plates 140 are only provided in the center in the Y axis direction.

As described above, in each of the module units 11, 12, and 13, the two energy storage devices 200 located in the center in the Y axis direction are more prone to increasing in temperature. As such, by disposing the partition plate 140 having high heat insulating properties only in the center position in the Y axis direction, heat transfer between these two energy storage devices 200 can be reduced. This makes it possible to reduce the impact of heat exchange between the two energy storage devices 200 located in the center in the Y axis direction that are prone to being high in temperature.

As is described above, with the energy storage apparatus 1 according to the embodiment of the present invention, since it is possible to increase the design flexibility of the module case 14, it is possible to easily change the configuration to suit the design requirements.

It should be noted that, as is illustrated in FIG. 13 and FIG. 14, when some partition plates 140 are removed from the module case 14 so that there are some pairs of energy storage devices 200 having no partition plate 140 therebetween, the space formed between these energy storage devices 200 maintains the electrical and heat insulation therebetween. In other words, provision of the partition plate 140 further increases the electrical and heat insulation between the energy storage devices 200. As such, with the energy storage apparatus according to the embodiment of the present invention, it is simple to selectively add the partition plate 140 in locations where electrical and heat insulation is desired to be further increased in accordance with the design requirements.

Moreover, since the case main body 100 of the module case 14 includes the plurality of partition portions 130 formed to partition a portion of the energy storage device 200 in the negative direction of the Z axis, the plurality of energy storage devices 200 can easily be disposed in predetermined locations. In other words, the plurality of partition portions 130 make is possible to easily determine the positioning of the energy storage devices 200 in the case main body 100.

Moreover, since the case main body 100 of the module case 14 includes, formed in the end portion of the partition portion 130 located in the positive direction of the Z axis, the groove 131 as the engagement portion that engages with the end portion 142 of the partition plate 140 located in the negative direction of the Z axis, it is possible to easily attach the partition plate 140 to the case main body 100 by simply inserting and engaging the partition plate 140 into the groove 131 of the partition portion 130.

Moreover, since the cut-out section 143 formed in the partition plate 140 and the ridge 131*a* formed in the groove 131 of the partition portion 130 engage each other in the groove 131, it is possible to restrict movement of the partition plate 140 in the groove 131.

Moreover, since the support portion 133 includes a groove 133*a* for engaging the protrusion 141, which is a portion of the partition plate 140 located in the positive direction of the Z axis, the attachment portion 134 can prevent misalignment of the partition plate 140 in both directions along the Y axis, which intersects the length of partition plate 140.

First Modified Embodiment

The energy storage apparatus 1 according to the above embodiment has a configuration in which the side of the protrusion 141 of the partition plate 140 located in the negative direction of the Z axis abuts the bottom surface 133*b* of the groove 133*a* in the support portion 133, but the energy storage apparatus 1 is not limited to this configuration. For example, the energy storage apparatus 1 may have the configuration exemplified by a case main body 100A and a partition plate 140A as illustrated in FIG. 15.

Figure 15:
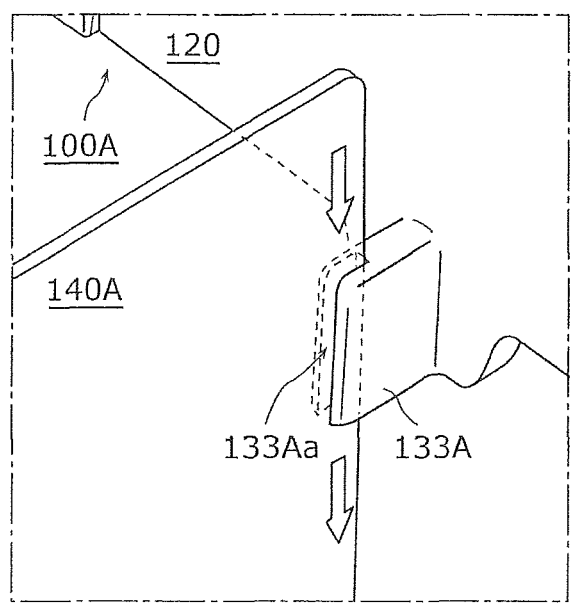
FIG. 15 illustrates how a partition plate attaches to a support portion of the case main body according to a first modified embodiment of the present invention.

FIG. 15 illustrates how the partition plate 140A attaches to a support portion 133A of the case main body 100A according to the first modified embodiment. It should be noted that the case main body 100A illustrated in FIG. 15 includes the partition portion 130 including the same groove 131 as the case main body 100. As is illustrated in FIG. 15, the partition plate 140A is different from the partition plate 140 according to the above embodiment in that it does not include the protrusion 141. Moreover, the partition plate 140A may have an X axis width that is constant throughout the Z axis. In other words, the partition plate 140A have an X axis width that is constant and equal to the X axis width of the partition plate 140 measured at the section including the protrusions 141. Moreover, the case main body 100A includes the support portion 133A having a groove 133Aa for fitting the second end portion of the partition plate 140A. In other words, the partition plate 140A has a configuration that allows it to slide while engaged with the groove 133Aa formed in the support portion 133A, and the groove 133Aa in the support portion 133A functions to guide the partition plate 140A.

Second Modified Embodiment

Figure 16:
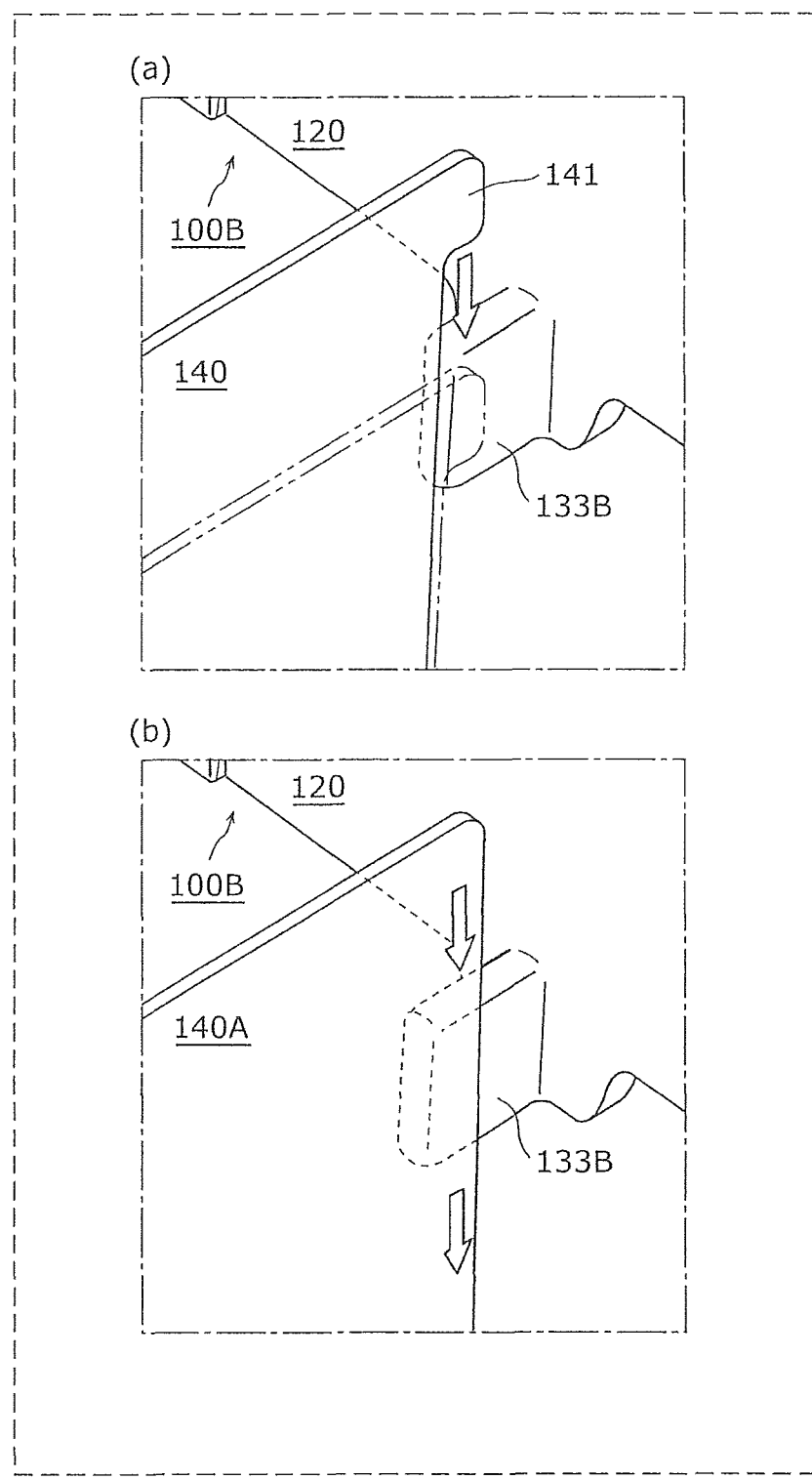
FIG. 16 illustrates how a partition plate attaches to a support portion of the case main body according to a second modified embodiment of the present invention.

For example, the energy storage apparatus 1 may have the configuration exemplified by a case main body 100B as illustrated in FIG. 16.

FIG. 16 illustrates how the partition plates 140 and 140A attached to a support portion 133B of the case main body 100B according to the second modified embodiment. It should be noted that (a) in FIG. 16 illustrates a configuration in which the partition plate 140 is used and (b) in FIG. 16 illustrates a configuration in which the partition plate 140A is used. Moreover, the case main body 100B illustrated in FIG. 16 includes the partition portion 130 including the same groove 131 as the case main body 100. As is illustrated in FIG. 16, unlike the support portions 133 and 133A formed in the case main bodies 100 and 100A, respectively, the support portion 133B formed in the case main body 100B does not include the groove 133*a* or 133Aa. In this way, the support portion may be the support portion 133B which protrudes from the case side wall portion 120 inward in the X axis direction and does not include a groove. More specifically, as is illustrated in (a) in FIG. 16, in the configuration in which the partition plate 140 is used, the support portion 133B is provided in a position where one surface of the protrusion 141 of the partition plate 140 is abuttable. Moreover, as is illustrated in (b) in FIG. 16, in the configuration in which the partition plate 140A is used, the support portion 133B is provided in a location abutting one surface of the end portion of the partition plate 140 located in the X axis direction. In other words, if the support portion is provided in a location abutting an end portion of at least one surface of the partition plates 140 and 140A located in the positive direction of the Z axis, the support portion may be the support portion 133B that does not include a groove which engages with the partition plates 140 and 140A. With this configuration, the support portion 133B can prevent misalignment of the partition plates 140 and 140A along the Y axis, which intersects the length of partition plates 140 and 140A, at least in the portion of the partition plates 140 and 140A located in the positive direction of the Z axis. Moreover, since the support portion 133B can be used as a guide when the partition plate 140 or 140A is inserted into the groove 131 of the partition portion 130, installation of either the partition plate 140 or 140A is simple.

Hereinbefore, the energy storage apparatus has been described based on the exemplary embodiment and modified embodiments thereof according to the present invention, but the scope of the present invention is not limited thereto. In other words, all aspects of the embodiment and modified embodiments thereof disclosed herein are examples, and are not intended to be limiting. Equivalents of the Claims and various modifications are intended to be included in the above which do not depart from the principles and spirit of the inventive concept, the scope of which is defined in the appended Claims and not the above-described exemplary embodiment. Various modifications resulting from arbitrary combinations of the exemplary embodiment and the modified embodiments are intended to be included within the scope of the present invention.

For example, in the above embodiment and modified embodiments, the energy storage apparatus includes the cooling apparatus 40, but the energy storage apparatus may have a configuration which does not include the cooling apparatus 40. Moreover, the energy storage apparatus includes the lower coupling component 20 and the upper coupling component 30, but the energy storage apparatus may have a configuration which does not include the lower coupling component 20 and the upper coupling component 30.

Moreover, in the above embodiment and modified embodiments, the lower coupling component 20 and the upper coupling component 30 are made of a conductive material, but the lower coupling component 20 and the upper coupling component 30 may be made from an insulating material such as resin. In this case, the region of the module case corresponding to the battery bottom surface of the case bottom portion may include a through-hole.

Moreover, in the above embodiment and modified embodiments, the energy storage device includes sheets that cover the side surfaces and the bottom surface, but the energy storage device may have a configuration which does not include the sheets.

Moreover, in the above embodiment and modified embodiments, a plurality of energy storage devices 200 are housed in the module case 14, but the module case may include only one energy storage device. It should be noted that when the module case only includes one energy storage device, the attachment portion for attaching the partition plate is formed adjacently to the side surface of the energy storage device. In other words, if the attachment portion for attachment of the partition plate is formed to the side of the energy storage device, it is possible to change the configuration to a configuration in which heat generated by the energy storage device does not transfer to a given side of the energy storage device, and is useful for maintaining electrical insulation on a given side of the energy storage device.

Moreover, in the above embodiment and modified embodiments, the partition plate 140 is a component having electrical and heat insulation properties, but the partition plate 140 is not required to have electrical and heat insulation properties. As long as the configuration allows for the partition plate to be installed, the partition plate is useful for blocking the heat generated by the energy storage device.

Moreover, in the above embodiment and modified embodiments, the groove 131 is formed in the partition portion 130 of the case main bodies 100, 100A, and 100B for engagement of the end portion 142 located in the negative direction of the Z axis of the partition plates 140 and 140A, but the formation of the groove is not limited to the partition portion 130. In other words, the case main body may have a configuration which does not include the partition portion. In this case, a groove for engagement of the end portion 142 located in the negative direction of the Z axis of the partition plates 140 and 140A may be formed in the case bottom portion located in the negative direction of the Z axis of the case main body, for example.

Moreover, the case main bodies 100, 100A, and 100B may have configurations in which the partition portion 130 does not include the groove 131. In this case, by forming the end portion of the partition plate located in the negative direction of the Z axis to have a shape that straddles so as to engage the end portion of the partition portion located in the positive direction of the Z axis, the partition portion may be an engagement portion for engaging the partition plate. In other words, the end portion of the partition plate located in the negative direction of the Z axis is thicker than the end portion of the partition portion located in the positive direction of the Z axis and has a groove conforming to the shape of the end portion of the partition portion located in the positive direction of the Z axis.

Moreover, the shape of both ends of the partition plate in the X axis direction may have a shape that straddles so as to engage the support portion 133B of the case main body 100B according to the second modified embodiment. In this case, when both ends of the partition plate in the X axis direction have protrusions similar to those found on the partition plate 140, the protrusions may be formed to be thicker than the support portions 133B and include grooves that correspond to the shape of the support portions 133 and are formed throughout in the Z axis direction. Moreover, when the partition plate has a configuration which does not include the protrusion, similar to the partition plate 140A, and also has an X axis width that is constant throughout the Z axis, the sides along the z axis of both ends of the partition plate in the X axis direction may be thicker than the support portion 133B and may include a groove in which the support portion 133B can slide in the Z axis direction.

Moreover, in the above embodiment and modified embodiments, the partition plates 140 and 140A are detachably attached to the case main bodies 100, 100A, and 100B, but are not required to be detachably attached. In other words, as long as the energy storage apparatus has a configuration in which the partition plates 140 and 140A and can be selectively installed in the case main bodies 100, 100A and 100B during assembly of the energy storage apparatus, the energy storage apparatus may have a configuration in which the partition plates 140 and 140A are not removable once installed. In other words, the case main body may have a configuration which does not include the groove for engaging the end portion of the partition plates 140 and 140A located in the negative direction of the Z axis, and an attachment portion such as a support portion to which the partition plates 140 and 140A can easily be fixed with, for example, an adhesive, may be formed on the case bottom portion or the case side wall of the case main body. It should be noted that the "support portion to which the partition plates 140 and 140A can easily be fixed" is preferably a support portion that can support the partition plate in at least two locations in at least one of the Z axis direction and the X axis direction.

Moreover, in the above embodiment and modified embodiments, the cut-out section 143 is formed in the end portion 142 of the partition plates 140 and 140A located in the negative direction of the Z axis, but the partition plates 140 and 140A may have a configuration which does not include the cut-out section 143. In this case, the ridge 131a is not formed in the groove 131 of the partition portion 130 in the case main bodies 100, 100A, and 100B.

The invention claimed is:

1. An energy storage apparatus, comprising:
    energy storage devices, each energy storage device including a side surface and a bottom surface; and
    an outer housing that houses the energy storage devices,
    wherein the outer housing comprises a bottom surface opposed to the bottom surface of at least one energy storage device of the energy storage devices and an attachment portion for attaching a partition plate adjacently to the side surface of the at least one energy storage device,
    wherein the attachment portion includes a partition portion that extends from the bottom surface of the outer housing and is disposed as to be opposed to the side surface of the at least one energy storage device,
    wherein the outer housing comprises an opening in a surface other than the bottom surface from which the partition portion extends, and
    wherein the opening is provided corresponding to a position of the attachment portion such that a flow of air passes between the energy storage devices.

2. The energy storage apparatus according to claim 1, wherein the outer housing is configured such that the partition plate is to be disposed on an extension line of the partition portion.

3. The energy storage apparatus according to claim 2, wherein the partition portion is continuously formed on the bottom surface and extends from a first side wall of the outer housing to a second side wall of the outer housing, the first and second side walls being opposite from each other and each being continuously formed on the bottom surface and intersecting the bottom surface.

4. The energy storage apparatus according to claim 2, wherein the partition portion comprises, at its tip end, a fitting portion for fitting an end portion of the partition plate.

5. The energy storage apparatus according to claim 2, wherein the partition portion comprises a material different from a material of the partition plate.

6. The energy storage apparatus according to claim 2, wherein the outer housing includes a first side wall and a second side wall that are opposite from each other and extend from the bottom surface of the outer housing, and
    wherein protrusions are provided on the partition portion with an interval in a direction intersecting the first side wall and the second side wall.

7. The energy storage apparatus according to claim 1, wherein the partition plate is detachably attached to the attachment portion.

8. The energy storage apparatus according to claim 1, wherein the partition plate comprises an insulating member.

9. The energy storage apparatus according to claim 1, wherein the at least one energy storage device comprises a plurality of energy storage devices that are arranged in a line, and
    wherein the attachment portion is formed between the energy storage devices such that the partition plate is attachable to the attachment portion.

10. The energy storage apparatus according to claim 9, wherein the partition plate includes a recessed section at a first end portion of the partition plate, and
    wherein the partition portion comprises a protruding section that is engageable with the recessed section, the protruding section being formed in the partition portion.

11. The energy storage apparatus according to claim 10, wherein the attachment portion comprises a support portion in a position where at least one surface of the partition plate in a vicinity of a second end portion of the partition plate is abuttable.

12. The energy storage apparatus according to claim 11, wherein the support portion includes a groove for fitting an end portion of the partition plate.

13. The energy storage apparatus according to claim 1, further comprising an abutment member abutting the at least one energy storage device,
    wherein an end portion of the partition plate abuts the abutment member.

14. The energy storage apparatus according to claim 1, wherein the side surface of the at least one energy storage device includes a long side surface of a rectangular, tubular metal chassis main body.

15. An energy storage apparatus, comprising:
    energy storage devices arranged side by side, each energy storage device including a side surface; and
    an outer housing that houses the energy storage devices,
    wherein the outer housing comprises a bottom surface, a side wall that extends vertically from the bottom surface, and an attachment portion for attaching a partition plate adjacently to the side surfaces of adjacent energy storage devices of the energy storage devices,
    wherein the attachment portion includes a partition portion that extends from the bottom surface and is disposed adjacently to the side surfaces of the adjacent energy storage devices of the energy storage devices,
    wherein the side wall includes an opening through which a gap defined between the side surfaces of the adjacent energy storage devices of the energy storage devices is exposed,
    wherein a side surface of the partition portion includes protrusions that abut the side surfaces of the adjacent energy storage devices of the energy storage devices, and
    wherein the opening is provided corresponding to a position of the attachment portion such that a flow of air passes between the energy storage devices.

16. The energy storage apparatus according to claim 15, wherein the partition plate is detachably attached to the attachment portion and is exposed through the opening.

17. The energy storage apparatus according to claim 15, wherein the protrusions extend vertically on the side surface of the partition portion from a bottom surface of the partition portion to a top surface of the partition portion.

18. The energy storage apparatus according to claim 15, wherein the protrusions further protrude from another side surface of the partition portion that opposes the side surface of the partition portion.

19. The energy storage apparatus according to claim 15, wherein the opening extends in the side wall in the stacking direction of the energy storage devices.

* * * * *